(12) United States Patent
Kodavalla et al.

(10) Patent No.: US 11,328,387 B1
(45) Date of Patent: May 10, 2022

(54) SYSTEM AND METHOD FOR IMAGE SCALING WHILE MAINTAINING ASPECT RATIO OF OBJECTS WITHIN IMAGE

(71) Applicant: Wipro Limited, Bangalore (IN)

(72) Inventors: Vijay Kumar Kodavalla, Bangalore (IN); Venumadhav Chittapragada Hanumantharao, Bangalore (IN)

(73) Assignee: Wipro Limited

( * ) Notice: Subject to any disclaimer, the term of this patent is extended or adjusted under 35 U.S.C. 154(b) by 0 days.

(21) Appl. No.: 17/179,859

(22) Filed: Feb. 19, 2021

(30) Foreign Application Priority Data

Dec. 17, 2020 (IN) .............................. 202041055019

(51) Int. Cl.
*G06T 3/40* (2006.01)

(52) U.S. Cl.
CPC .......... *G06T 3/4023* (2013.01); *G06T 3/4084* (2013.01)

(58) Field of Classification Search
CPC ....... G06T 3/4023; G06T 3/40; G06T 3/4007; G06T 3/403; G06T 3/4053; G06T 2219/2016; H04N 7/0135; H04N 7/0142; H04N 9/3188; H04N 21/26616; H04N 21/462; G06V 10/7715; G06V 30/19127; G06K 9/6232; G06K 9/6251
See application file for complete search history.

(56) References Cited

U.S. PATENT DOCUMENTS

| | | | | |
|---|---|---|---|---|
| 6,825,857 B2* | 11/2004 | Harasimiuk | .......... | G06T 3/4023 345/660 |
| 7,277,101 B2* | 10/2007 | Zeng | ..................... | G06T 3/4084 345/600 |
| 7,477,323 B2* | 1/2009 | Chou | ..................... | G06T 3/4007 348/581 |
| 7,542,053 B2* | 6/2009 | Berenguer | ............ | G06T 3/4084 345/698 |
| 7,590,307 B2* | 9/2009 | Wang | ........................ | G06T 7/13 382/199 |
| 7,782,401 B1* | 8/2010 | Chou | ...................... | G06T 3/403 348/625 |
| 9,275,434 B2* | 3/2016 | Lin | ........................ | G06T 3/4007 |
| 9,741,097 B2* | 8/2017 | Sonoda | ................. | G06T 3/4053 |
| 10,192,061 B2* | 1/2019 | Kumar | .................. | G06F 21/602 |
| 10,650,778 B2* | 5/2020 | Jang | ......................... | G09G 3/20 |

(Continued)

*Primary Examiner* — Manav Seth
(74) *Attorney, Agent, or Firm* — Finnegan, Henderson, Farabow, Garrett & Dunner, LLP

(57) ABSTRACT

The disclosure relates to method and system for image scaling. The method includes determining a nature of image scaling required to be performed on an input image based on a vertical scaling ratio and a horizontal scaling ratio and includes determining if the image scaling is an upscaling or a downscaling, a symmetric scaling or an asymmetric scaling. The method further includes determining an overall scaling ratio based on a lower or an equal of the vertical scaling ratio and the horizontal scaling ratio. The method further includes scaling an input image to a target image using a polyphase finite impulse response (FIR) scaling filter based on the nature of the image scaling, the overall scaling ratio, and a structure of the polyphase FIR scaling filter. The scaling includes dynamically performing at least one of duplication of lines, addition of filler lines, duplication of pixels, and addition of filler pixels.

20 Claims, 20 Drawing Sheets

(56) References Cited

U.S. PATENT DOCUMENTS

| | | | |
|---|---|---|---|
| 11,094,038 B1* | 8/2021 | Kornienko | G06T 3/40 |
| 2005/0141784 A1* | 6/2005 | Ferriz | G06T 3/4023 |
| | | | 708/290 |
| 2007/0160126 A1* | 7/2007 | Van Der Meer | H04N 19/12 |
| | | | 375/E7.199 |
| 2008/0012882 A1* | 1/2008 | Koyanagi | H03H 17/0657 |
| | | | 345/660 |
| 2008/0174694 A1* | 7/2008 | Morad | H04N 7/0142 |
| | | | 348/E7.003 |
| 2015/0278991 A1* | 10/2015 | Kodavalla | G06T 3/4023 |
| | | | 345/660 |

\* cited by examiner

- Input image frame resolution = 32x30 (32 pixels per line, 30 lines per image frame)
- Output image frame resolution = 8x8 (8 pixels per line, 8 lines per image)
- VSR = 8/32 = 1/4
- NVFP = 16
- VOGD = 16/(1/4) = 64 (or 0x00400000 in hex format where most significant 16 bits denote integer part while the least significant 16 bits denote the fractional part).
- i = line number in the output image frame

| $L_o(i)$ | VOCGD (as per Equation (1)) | VFP (as per Equation (2)) | STIL(i) (as per Equation (3a)) | LB7-LB6-LB5-LB4-LB3-LB2-LB1-LB0 |
|---|---|---|---|---|
| 0 | 0 in decimal or 0 x 00000000 in hex | 0 | 4 | 4-3-2-1-0-0-0-0 |
| 1 | 64 in decimal or 0 x 00400000 in hex | 0 | 8 | 8-7-6-5-4-3-2-1 |
| 2 | 128 in decimal or 0 x 00800000 in hex | 0 | 12 | 12-11-10-9-8-7-6-5 |
| 3 | 192 in decimal or 0 x 00C00000 in hex | 0 | 16 | 16-15-14-13-12-11-10-9 |
| 4 | 256 in decimal or 0 x 01000000 in hex | 0 | 20 | 20-19-18-17-16-15-14-13 |
| 5 | 320 in decimal or 0 x 01400000 in hex | 0 | 24 | 24-23-22-21-20-19-18-17 |
| 6 | 384 in decimal or 0 x 01800000 in hex | 0 | 28 | 28-27-26-25-24-23-22-21 |
| 7 | 448 in decimal or 0 x 01C00000 in hex | 0 | 32 | 29-29-29-29-28-27-26-25 |

FIG. 8A

- Input image frame resolution = 24x18 (24 pixels per line, 18 lines per image frame)
- Output image frame resolution = 8x8 (8 pixels per line, 8 lines per image)
- VSR = 8/24 = 1/3
- NVFP = 16
- VOGD = 16/(1/3) = 48 (or 0x00300000 in hex format where most significant 16 bits denote integer part while the least significant 16 bits denote the fractional part).
- i = line number in the output image frame

| Lo (i) | VOCGD (as per Equation (1)) | VFP (as per Equation (2)) | STIL(i) (as per Equation (3a)) | LB7-LB6-LB5-LB4-LB3-LB2-LB1-LB0 |
|---|---|---|---|---|
| 0 | 0 in decimal or 0 x 00000000 in hex | 0 | 4 | 4-3-2-1-0-0-0-0 |
| 1 | 48 in decimal or 0 x 00300000 in hex | 0 | 7 | 7-6-5-4-3-2-1-0 |
| 2 | 96 in decimal or 0 x 00600000 in hex | 0 | 10 | 10-9-8-7-6-5-4-3 |
| 3 | 144 in decimal or 0 x 00900000 in hex | 0 | 13 | 13-12-11-10-9-8-7-6 |
| 4 | 192 in decimal or 0 x 00C00000 in hex | 0 | 16 | 16-15-14-13-12-11-10-9 |
| 5 | 240 in decimal or 0 x 00F00000 in hex | 0 | 19 | 17-17-17-16-15-14-13-12 |
| 6 | 288 in decimal or 0 x 01200000 in hex | 0 | 22 | NL-NL-NL-NL-NL-NL-NL-NL |
| 7 | 336 in decimal or 0 x 01500000 in hex | 0 | 25 | NL-NL-NL-NL-NL-NL-NL-NL |

FIG. 8B

- Input image frame resolution = 8x8 (8 pixels per line, 8 lines per image frame)
- Output image frame resolution = 10x10 (10 pixels per line, 10 lines per image)
- VSR = 10/8 = 1.25
- NVFP = 16
- VOGD = 16/(10/8) = 12.8 (or 0x000C0008 in hex format where most significant 16 bits denote integer part while the least significant 16 bits denote the fractional part).
- i = line number in the output image frame

| $L_o(i)$ | VOCGD (as per Equation (1)) | VFP (as per Equation (2)) | STIL(i) (as per Equation (3b)) | LB3-LB2-LB1-LB0 |
|---|---|---|---|---|
| 0 | 0 in decimal or 0 x 00000000 in hex | 0 | 2 | 2-1-0-0 |
| 1 | 12.8 in decimal or 0 x 000C0008 in hex | 12 | 2 | 2-1-0-0 |
| 2 | 25.6 in decimal or 0 x 00190006 in hex | 9 | 3 | 3-2-1-0 |
| 3 | 38.4 in decimal or 0 x 00260004 in hex | 6 | 4 | 4-3-2-1 |
| 4 | 51.2 in decimal or 0 x 00330002 in hex | 3 | 5 | 5-4-3-2 |
| 5 | 64 in decimal or 0 x 00400000 in hex | 0 | 6 | 6-5-4-3 |
| 6 | 76.8 in decimal or 0 x 004C0008 in hex | 12 | 6 | 6-5-4-3 |
| 7 | 89.6 in decimal or 0 x 00590006 in hex | 9 | 7 | 7-6-5-4 |
| 8 | 102.4 in decimal or 0 x 00660004 in hex | 6 | 8 | 7-7-6-5 |
| 9 | 115.2 in decimal or 0 x 00730002 in hex | 3 | 9 | NL-NL-NL-NL |

- Input image frame resolution = 8x4 (8 pixels per line, 4 lines per image frame)
- Output image frame resolution = 10x10 (10 pixels per line, 10 lines per image)
- VSR = 10/8 = 1.25
- NVFP = 16
- VOGD = 16/(10/8) = 12.8 (or 0x000C0008 in hex format where most significant 16 bits denote integer part while the least significant 16 bits denote the fractional part).
- i = line number in the output image frame

| $L_o(i)$ | VOCGD (as per Equation (1)) | VFP (as per Equation (2)) | STIL(i) (as per Equation (3b)) | LB3-LB2-LB1-LB0 |
|---|---|---|---|---|
| 0 | 0 in decimal or 0 x 00000000 in hex | 0 | 2 | 2-1-0-0 |
| 1 | 12.8 in decimal or 0 x 000C0008 in hex | 12 | 2 | 2-1-0-0 |
| 2 | 25.6 in decimal or 0 x 00190006 in hex | 9 | 3 | 3-2-1-0 |
| 3 | 38.4 in decimal or 0 x 00260004 in hex | 6 | 4 | 3-3-2-1 |
| 4 | 51.2 in decimal or 0 x 00330002 in hex | 3 | 5 | NL-NL-NL-NL |
| 5 | 64 in decimal or 0 x 00400000 in hex | 0 | 6 | NL-NL-NL-NL |
| 6 | 76.8 in decimal or 0 x 004C0008 in hex | 12 | 6 | NL-NL-NL-NL |
| 7 | 89.6 in decimal or 0 x 00590006 in hex | 9 | 7 | NL-NL-NL-NL |
| 8 | 102.4 in decimal or 0 x 00660004 in hex | 6 | 8 | NL-NL-NL-NL |
| 9 | 115.2 in decimal or 0 x 00730002 in hex | 3 | 9 | NL-NL-NL-NL |

FIG. 8D

- Input image frame resolution = 30x32 (30 pixels per line, 32 lines per image frame)
- Output image frame resolution = 8x8 (8 pixels per line, 8 lines per image)
- HSR = 8/32 = 1/4
- NHFP = 16
- HOGD = 16/(1/4) = 64 (or 0x00400000 in hex format where most significant 16 bits denote integer part while the least significant 16 bits denote the fractional part).
- i = pixel number in line of the output image frame

| $P_O$ (i) | HOCGD (31:0) (as per Equation (4)) | HFP (as per Equation (5)) | STIP (i) (as per Equation (6a)) | PB7-PB6-PB5-PB4-PB3-PB2-PB1-PB0 |
|---|---|---|---|---|
| 0 | 0 in decimal or 0 x 00000000 in hex | 0 | 4 | 4-3-2-1-0-0-0-0 |
| 1 | 64 in decimal or 0 x 00400000 in hex | 0 | 8 | 8-7-6-5-4-3-2-1 |
| 2 | 128 in decimal or 0 x 00800000 in hex | 0 | 12 | 12-11-10-9-8-7-6-5 |
| 3 | 192 in decimal or 0 x 00C00000 in hex | 0 | 16 | 16-15-14-13-12-11-10-9 |
| 4 | 256 in decimal or 0 x 01000000 in hex | 0 | 20 | 20-19-18-17-16-15-14-13 |
| 5 | 320 in decimal or 0 x 01400000 in hex | 0 | 24 | 24-23-22-21-20-19-18-17 |
| 6 | 384 in decimal or 0 x 01800000 in hex | 0 | 28 | 28-27-26-25-24-23-22-21 |
| 7 | 448 in decimal or 0 x 01C00000 in hex | 0 | 32 | 29-29-29-29-28-27-26-25 |

FIG. 9A

- Input image frame resolution = 4x15 (4 pixels per line, 15 lines per image frame)
- Output image frame resolution = 10x10 (10 pixels per line, 10 lines per image)
- HSR = 10/15 = $2/3$
- NHFP = 16
- HOGD = 16/(2/3) = 24 (or 0x00180000 in hex format).
- i = pixel number in line of the output image frame

| $P_o$ (i) | HOCGD (31:0) (as per Equation (4)) | HFP (as per Equation (5)) | STIP (i) (as per Equation (6a)) | PB7-PB6-PB5-PB4-PB3-PB2-PB1-PB0 |
|---|---|---|---|---|
| 0 | 0 in decimal or 0 x 00000000 in hex | 0 | 4 | 3-3-2-1-0-0-0-0 |
| 1 | 24 in decimal or 0 x 00180000 in hex | 8 | 5 | 3-3-3-2-1-0-0-0 |
| 2 | 48 in decimal or 0 x 00300000 in hex | 0 | 7 | NP-NP-NP-NP-NP-NP-NP-NP |
| 3 | 72 in decimal or 0 x 00480000 in hex | 8 | 8 | NP-NP-NP-NP-NP-NP-NP-NP |
| 4 | 96 in decimal or 0 x 00600000 in hex | 0 | 10 | NP-NP-NP-NP-NP-NP-NP-NP |
| 5 | 120 in decimal or 0 x 00780000 in hex | 8 | 11 | NP-NP-NP-NP-NP-NP-NP-NP |
| 6 | 144 in decimal or 0 x 00900000 in hex | 0 | 13 | NP-NP-NP-NP-NP-NP-NP-NP |
| 7 | 168 in decimal or 0 x 00A80000 in hex | 8 | 14 | NP-NP-NP-NP-NP-NP-NP-NP |
| 8 | 192 in decimal or 0 x 00C00000 in hex | 0 | 16 | NP-NP-NP-NP-NP-NP-NP-NP |
| 9 | 216 in decimal or 0 x 00D80000 in hex | 8 | 17 | NP-NP-NP-NP-NP-NP-NP-NP |

FIG. 9B

- Input image frame resolution = 4x2 (4 pixels per line, 2 lines per image frame)
- Output image frame resolution = 7x7 (7 pixels per line, 7 lines per image)
- HSR = 7/4 = 1.75
- NHFP = 16
- HOGD = 16/(7/4) = 9.1 (or 0x00090001 in hex format where most significant 16 bits denote integer part while the least significant 16 bits denote the fractional part).
- i = pixel number in line of the output image frame

| P$_o$ (i) | HOCGD (31:0) (as per Equation (4)) | HFP (as per Equation (5)) | STIP (i) (as per Equation (6b)) | PB3-PB2-PB1-PB0 |
|---|---|---|---|---|
| 0 | 0 in decimal or 0 x 00000000 in hex | 0 | 2 | 2-1-0-0 |
| 1 | 9.1 in decimal or 0 x 00090001 in hex | 9 | 2 | 2-1-0-0 |
| 2 | 18.2 in decimal or 0 x 00120002 in hex | 2 | 3 | 3-2-1-0 |
| 3 | 27.3 in decimal or 0 x 001B0003 in hex | 11 | 3 | 3-2-1-0 |
| 4 | 36.4 in decimal or 0 x 00240004 in hex | 4 | 4 | 3-3-2-1 |
| 5 | 45.5 in decimal or 0 x 002D0005 in hex | 13 | 4 | 3-3-2-1 |
| 6 | 54.6 in decimal or 0 x 00360006 in hex | 6 | 5 | NP-NP-NP-NP |

FIG. 9C

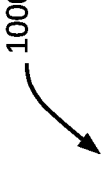

| Filter type | Nature of Image Scaling | Scaling Operations Performed |
|---|---|---|
| Vertical Filter | Symmetric Upscaling | Duplication of lines at start/end of the frame & Addition of Filler lines at the end of the frame |
| | Symmetric Downscaling | Duplication of lines at start/end of the frame |
| | Asymmetric Upscaling | Duplication of lines at start/end of the frame & Addition of Filler lines at the end of the frame |
| | Asymmetric Downscaling | Duplication of lines at start/end of the frame & Addition of Filler lines at the end of the frame |
| Horizontal Filter | Symmetric Upscaling | Duplication of pixels at start/end of the frame lines & Addition of Filler pixels at the end of the frame lines |
| | Symmetric Downscaling | Duplication of pixels at start/end of the frame lines |
| | Asymmetric Upscaling | Duplication of pixels at start/end of the frame lines & Addition of Filler pixels at the end of the frame lines |
| | Asymmetric Downscaling | Duplication of pixels at start/end of the frame lines & Addition of Filler pixels at the end of the frame lines |

FIG. 10

SYSTEM AND METHOD FOR IMAGE SCALING WHILE MAINTAINING ASPECT RATIO OF OBJECTS WITHIN IMAGE

TECHNICAL FIELD

This disclosure relates generally to image scaling, and more particularly to method and system for scaling an image while maintaining an aspect ratio of objects within an image.

BACKGROUND

Image scaling is an image processing mechanism with a wide variety of applications. For example, image scaling is required in many display devices for efficient viewing. Source images are required to be scaled up or down for displaying on the display devices when source resolution of the source image is different than that of the display. Such up or down scaling applies to both images and a video stream. Similarly, for example, image scaling is required in many applications to perform subsequent processing. Source images are required to be scaled up or down to a pre-defined size before being ingested and processed by a software application (e.g., artificial neural network (ANN) based image classification or object detection model).

Prevalent, image scaling techniques calculate mapping of source pixels and lines to corresponding target pixels and lines based on a specified input and output resolution. Poly-phase Finite Impulse Response (FIR) filtering based image scaling techniques is an example of the prevalent conventional image scaling techniques. However, use of the poly-phase FIR filtering needs complex floating point arithmetic and expensive divider logic to support a fractional image scaling ratio. Further, the poly-phase FIR filtering needs complex flow control logic for shifting image data through filters and handling data replication at image boundaries. This is due to the fact that shifting input image data through filters and replication of image data at image boundaries depends on scaling ratios, which may be fractional. As a result, to achieve best results the display devices and embedded applications within the display devices may require use of complex multipliers, dividers logic in addition to adders/subtractors and comparators. This makes the polyphase FIR filtering based image scaling techniques unsuitable for battery operated devices and embedded systems. Also, execution of the flow control logic for shifting the image data may be quite complex.

In addition, during the image scaling, stretching of the image due to a change of shape negatively impacts object detection or image classification when fed into an artificial intelligence (AI) based system resulting in generation of false positives/negatives. Typical image classification or object detection applications using neural network models, such as Convolutional Neural Network (CNN) models, require a square shaped image (such as 224 pixels×224 lines, 416 pixels×416 lines or 448 pixels×448 lines) as input, whereas resolution of a typical image/video capturing system is of the order of, for example, 720p (Width×Height=1280 pixels×720 lines with a 16:9 aspect ratio) and, for example, 1080i/1080p (Width×Height=1920 pixels×1080 lines with 16:9 aspect ratio), and so forth.

Hence for such image classification application, the incoming images need to be scaled before being fed into the CNN for image classification or object detection. For example, an image may have a resolution as 1280 pixels×720 lines, while the input image required for the CNN based image classification or object detection model may be 448 pixels×448 lines. In such situations, the scaling may need to be performed with scaling ratios of 0.35 pixels×0.6222 lines on the incoming images before being fed into the CNN for image classification or object detection. Such disproportionate or asymmetric image scaling may lead to occurrence of unwanted stretch and distortion of the image, thus making it unsuitable to be used as an input for a classification application. Further, stretching due to a change of the shape may negatively impact object detection or image classification when fed into the AI based system leading to generation of false positives/negatives.

SUMMARY

In one embodiment, a method of image scaling is disclosed. In one example, the method may include determining a nature of image scaling required to be performed on an input image based on a vertical scaling ratio and a horizontal scaling ratio. It should be noted that determining the nature of image scaling includes determining if the image scaling is an upscaling or a downscaling, and determining if the image scaling is a symmetric scaling or an asymmetric scaling. The method may further include determining an overall scaling ratio based on a lower or an equal of the vertical scaling ratio and the horizontal scaling ratio. The method may further include scaling an input image to a target image using a polyphase finite impulse response (FIR) scaling filter based on the nature of the image scaling, the overall scaling ratio, and a structure of the polyphase FIR scaling filter. It should be noted that scaling may further include dynamically performing at least one of: duplication of lines at a start or at an end of the input image; addition of filler lines at the end of the input image; duplication of pixels at a start or at an end of each line of the input image; and addition of filler pixels at the end of the each line of the input image.

In another embodiment, a system for image scaling is disclosed. In one example, the system may include a processor and a memory communicatively coupled to the processor, wherein the memory stores processor-executable instructions, which on execution may cause the processor to determine a nature of image scaling required to be performed on an input image based on a vertical scaling ratio and a horizontal scaling ratio. It should be noted that determining the nature of image scaling includes determining if the image scaling is an upscaling or a downscaling, and determining if the image scaling is a symmetric scaling or an asymmetric scaling. The processor-executable instructions, on execution, may further cause the processor to determine an overall scaling ratio based on a lower or an equal of the vertical scaling ratio and the horizontal scaling ratio. The processor-executable instructions, on execution, may further cause the processor to scale an input image to a target image using a polyphase finite impulse response (FIR) scaling filter based on the nature of the image scaling, the overall scaling ratio, and a structure of the polyphase FIR scaling filter. It should be noted that the scaling includes dynamically performing at least one of: duplication of lines at a start or at an end of the input image; addition of filler lines at the end of the input image; duplication of pixels at a start or at an end of each line of the input image; and addition of filler pixels at the end of the each line of the input image.

In one embodiment, a non-transitory computer-readable medium storing computer-executable instructions for image scaling is disclosed. In one example, the stored instructions, when executed by a processor, causes the processor to perform operations including determining a nature of image scaling required to be performed on an input image based on a vertical scaling ratio and a horizontal scaling ratio. It should be noted that determining the nature of image scaling includes determining if the image scaling is an upscaling or a downscaling, and determining if the image scaling is a symmetric scaling or an asymmetric scaling. The operations further include determining an overall scaling ratio based on a lower or an equal of the vertical scaling ratio and the horizontal scaling ratio. The operations further include scaling an input image to a target image using a polyphase finite impulse response (FIR) scaling filter based on the nature of the image scaling, the overall scaling ratio, and a structure of the polyphase FIR scaling filter. It should be noted that scaling may further include dynamically performing at least one of: duplication of lines at a start or at an end of the input image; addition of filler lines at the end of the input image; duplication of pixels at a start or at an end of each line of the input image; and addition of filler pixels at the end of the each line of the input image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 8A is an exemplary table representing a line buffer load and a shift needed for performing ¼ downscaling in a vertical direction of an input image frame with 8 filter taps, in accordance with some embodiments of the present disclosure.

FIG. 8B is an exemplary table representing a line buffer load and a shift needed for performing ⅓ downscaling in a vertical direction of an input image frame with 8 filter taps, in accordance with some embodiments of the present disclosure.

FIG. 8C is an exemplary table representing a line buffer load and a shift needed for performing 10/8 upscaling in a vertical direction of an input image frame with 8 filter taps, in accordance with some embodiments of the present disclosure.

FIG. 8D is an exemplary table representing a line buffer load and a shift needed for performing 10/8 upscaling in a vertical direction of an input image frame with 4 filter taps, in accordance with some embodiments of the present disclosure.

FIG. 9A is an exemplary table representing a pixel buffer load needed for ¼ downscaling in a horizontal direction with 8 filter taps, in accordance with some embodiments of the present disclosure.

FIG. 9B is an exemplary table representing a pixel buffer load needed for ⅔ downscaling in a horizontal direction with 8 filter taps, in accordance with some embodiments of the present disclosure.

FIG. 9C is an exemplary table representing a pixel buffer load needed for 1.75 upscaling in a horizontal direction with 4 filter taps, in accordance with some embodiments of the present disclosure.

FIG. 10 is an exemplary table representing scaling operations to be performed based on a nature of image scaling required, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
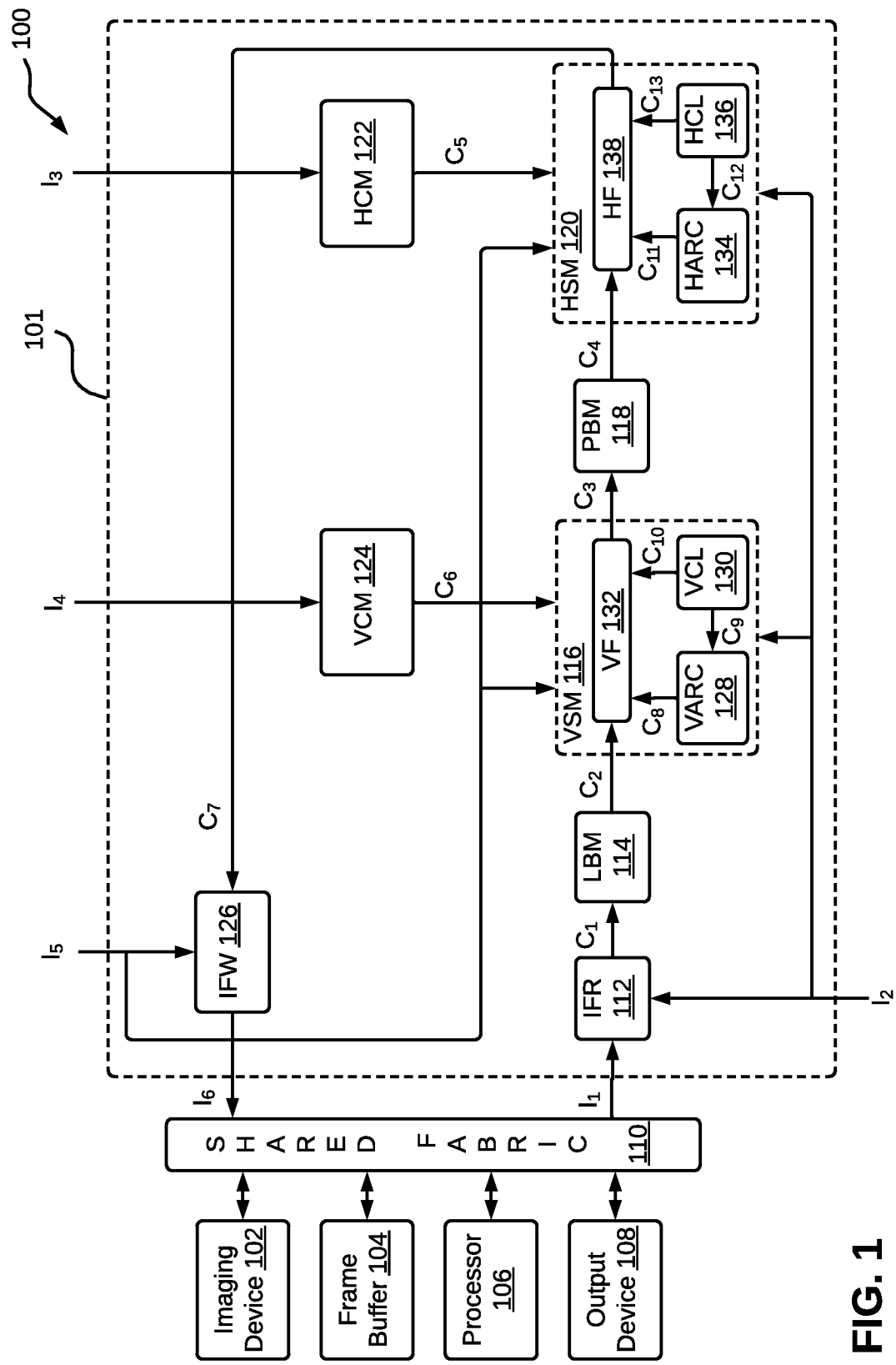
FIG. 1 illustrates a functional block diagram of an exemplary system for performing image scaling on an input image while adaptively maintaining an aspect ratio of the input image in the output image, in accordance with some embodiments of the present disclosure.

Referring now to FIG. 1, a functional block diagram of an exemplary system 100 for performing image scaling is illustrated, in accordance with some embodiments of the present disclosure. It should be noted that the system 100 performs image scaling on an input image while adaptively maintaining an aspect ratio of the input image in the output image. The system 100 may include an imaging device 102, a frame buffer 104, a processor 106, an output device 108, a shared bus fabric 110, and an image scaling device 101.

The image scaling device 101 may further include an image frame reader (IFR) module 112, a line buffer data memory (LBM) module 114, a vertical scalar module (VSM) 116, a pixel buffer data memory (PBM) module 118, a horizontal scalar module (HSM) 120, a horizontal coefficient memory (HCM) module 122, a vertical coefficient memory (VCM) module 124, and an image frame write (IFW) module 126. The VSM 116 may include a vertical aspect ratio controller (VARC) sub-block 128, a vertical control logic (VCL) sub-block 130 and a vertical filter (VF) sub-block 132. Further, the HSM 120 may include a horizontal aspect ratio controller (HARC) sub-block 134, a horizontal control logic (HCL) sub-block 136 and a horizontal filter (HF) sub-block 138.

In an embodiment, the shared bus fabric 110 may provide control or data path connectivity between various modules for exchange of control or data information respectively.

In an embodiment, the imaging device 102 (e.g., camera) may store the incoming image frames in the frame buffer 104 over the shared bus fabric 110. The incoming image frames may be present in various standard pixel formats including such as RGB, YUV, YCbCr and the like. The incoming image frames stored in the frame buffer 104 may be read by the IFR module 112 over the shared bus fabric 110 for further processing. The IFR module 112 may connect to the shared bus fabric 110 using a standard interface such as an Advanced Microcontroller Bus Architecture (AMBA) advanced eXtensible interface (AXI).

In an embodiment, the input image frames read by the IFR module 112 may be stored in the LBM module 114. Further, input and output interface of the LBM module 114 may be realized using parallel pixel buffer interface.

In an embodiment, the VSM 116 may perform a function of generating a vertically scaled image while leaving a horizontal resolution of the incoming image frames captured by the input device 102 unchanged.

In an embodiment, the vertically scaled image frame generated by the VSM 116 may be written into the PBM module 118. The HSM 120 may perform a reading of the PBM module 118. Further, the HSM 120 may perform a horizontal scaling of the vertically scaled image frame and may generate an output image frame. The input and output interface of the PBM module 118 may be realized using a parallel pixel buffer interface.

In an embodiment, each of the output line from the VSM 116 (i.e., the output line being vertically scaled with respect to the input image frame) may pass through the HSM 120 so as to undergo the horizontal scaling.

In an embodiment, the IFW module 126 may transfer the output of the HSM 120 into the frame buffer 104 over the shared bus fabric 110. The IFW module 126 may connect with the shared bus fabric 110 using a standard AMBA AXI interface.

In addition to the above mentioned multiple modules and the sub-blocks, the imaging scaling system 100 may include multiple interfaces and connections.

In an embodiment, the multiple interfaces may include an image frame read interface (I1), a user input of input frame resolution interface (I2), a user input of filter coefficients for the horizontal filter interface (I3), a user input of filter coefficients for the vertical filter interface (I4), a user input of output frame resolution interface (I5), and an image frame write interface (I6). The multiple connections may include an image frame data connection (C1), a line buffer connection (C2), a pixel buffer input connection (C3), a pixel buffer output connection (C4), a horizontal coefficient connection (C5), a vertical coefficient connection (C6), a scaled image connection (C7), a vertical aspect ratio controller to filter connection (C8), a vertical control logic to aspect ratio controller connection (C9), a vertical control logic to filter connection (C10), a horizontal aspect ratio controller to filter connection (C11), a horizontal control logic to aspect ratio controller connection (C12), and a horizontal control logic to filter connection (C13).

In an embodiment, the IFR module 112 may connect and communicate with the shared bus fabric 110 through the image frame read interface (I1). An image frame data to be scaled may be read from the frame buffer 104 over the shared bus fabric 110 through the interface I1. As can be appreciated by those skilled in the art, the image frame data may be available in various standard pixel formats including Red Green Blue (RGB), YUV, YCbCr and the like. The I1 interface may be realized using a standard bus interface such as AMBA AXI and the like.

In an embodiment, for the user input of frame resolution interface (I2), a user may specify a frame resolution (Width× Height) of an input image as received from the imaging device 102. The imaging device 102 may be any of a mechanical, a digital, or an electronic image device including, but not limited to, a still camera; a camcorder; a motion picture camera; or any other instrument, equipment, or format capable of recording, storing, or transmitting visual images.

The specified frame resolution may determine an amount of data to be read from the frame buffer 104 over the shared bus fabric 110 for a single input image and may correspond to a pre-scaled image resolution. The specified frame resolution of the input image frame may also be used in the HSM 120 and the VSM 116 for determining a scaling ratio. The I2 interface may be realized using a standard bus interface such as an AMBA Advanced Peripheral Bus (APB) and the like.

In an embodiment, for the user input of filter coefficients for the horizontal filter interface (I3), the user may specify coefficients for a polyphase FIR scaling filter to be used in a horizontal scaling. The specified coefficients may be loaded into the HCM module 122. As can be appreciated, a set of coefficients as specified may be different for each of an upscaling and a downscaling operation. The I3 interface may be realized using a standard bus interface such as AMBA APB, and the like.

In an embodiment, for the user input of filter coefficients for the vertical filter interface (I4), the user may specify the coefficients for a polyphase FIR scaling filter to be used in vertical scaling. The coefficients may be loaded into the VCM module 124. As can be appreciated, a set of coefficients as specified may be different for each of an upscaling and a downscaling operation. The I4 interface may be realized using a standard bus interface such as AMBA APB and the like.

In an embodiment, the user input of output frame resolution interface (I5) may correspond to a post scaled image frame resolution. The output image frame resolution may also be used in the HSM 120 and the VSM 116 for determining a scaling ratio. The I5 interface may be realized using a standard bus interface such as AMBA APB and the like. In an embodiment, user specified output image resolution transmitted through the interface (I5) may be used to calculate an amount of data which needs to be transferred per image frame.

In an embodiment, the image frame write interface (I6) may act as an interface between the IFW module 126 and the shared bus fabric 110. The up or down scaled and shaped image frame data may be transferred back to the frame buffer 104 over the shared bus fabric 110, through the I6 interface. In an embodiment, the image frame may be in various standard pixel formats including RGB, YUV, YCbCr, and the like. The I6 interface may be realized using a standard bus interface such as AMBA AXI and the like.

In an embodiment, the IFR module 112 may forward the image frame read from the frame buffer 104, over the shared bus fabric 110 to the LBM module 114 though the image frame data connection (C1). The image frame may be available in various standard pixel formats including such as RGB, YUV, YCbCr, and the like. The interface for C1 connection may be realized using, e.g., a parallel pixel bus interface.

In an embodiment, the VSM module 116 may use the line buffer connection (C2) for reading data corresponding to each "line" of an input image frame from the LBM module 114. The interface for C2 connection may be realized using such as a parallel pixel bus interface.

In an embodiment, the VSM module 116 may use the pixel buffer input connection (C3) to write out the pixel data corresponding to a vertically scaled and shaped image frame to the PBM module 118. The data may correspond to an output of a standard FIR filter. The interface for C3 connection may be realized using such as a parallel pixel bus interface.

In an embodiment, the HSM 120 may use the pixel buffer output connection (C4) to read pixel data of a vertically scaled and shaped image frame from the PBM module 118. The read pixel data may be used for performing a horizontal scaling operation inside the HSM 120. The interface for C4 connection may be realized using such as a parallel pixel bus interface.

In an embodiment, the filter coefficients configured by the user for a horizontal FIR filter which may be stored in the HCM module 122 may be read using the horizontal coefficient connection (C5) to be used in performing horizontal scaling operation. The interface for C5 connection may be realized using such as a standard memory bus interface.

In an embodiment, the user configured filter coefficients for a vertical FIR filter which may be stored in the VCM module 116 may be read using the vertical coefficient connection (C6) to be used in performing vertical scaling operation. The interface for C6 connection may be realized using such as a standard memory bus interface.

In an embodiment, the scaled image connection (C7) may be used by the HSM 120 to transfer the output scaled image frame to the IFW module 126 to be eventually transferred to the frame buffer 104 over the shared bus fabric 110. The data may correspond to output of the standard FIR filter. The image frame transferred over the C7 connection may be upscaled or downscaled and may be shaped in both vertical as well as horizontal directions. The interface for C7 connection may be realized using such as a parallel pixel bus interface.

In an embodiment, the vertical aspect ratio controller to filter connection (C8) may be used by the VARC sub-block 128 to transfer the control information required by the VF sub-block 132 to perform shifting of line buffers (LBx). The interface for C8 connection may be realized using such as custom interface signals.

In an embodiment, the vertical control logic to aspect ratio controller connection (C9), may be used by the VCL sub-block 130 to transfer the computed parameter which is used by the VARC sub-block 128 to determine a number of lines to be duplicated or a number of filler lines to be inserted. The interface for C9 connection may be realized using such as custom interface signals.

In an embodiment, the vertical control logic to filter connection (C10), may be used by the VCL sub-block 130 to transfer the filter coefficients to the VF sub-block 132. The filter coefficients may be calculated as a function of a vertical output cumulative grid distance (VOCGD). The interface for C10 connection may be realized using such as custom interface signals.

In an embodiment, the horizontal aspect ratio controller to filter connection (C11) may be used by the HARC sub-block 134 to transfer control information required by the HF sub-block 138 to perform shifting of pixel buffers (PBx). The interface for C11 connection may be realized using such as custom interface signals.

In an embodiment, the horizontal control logic to aspect ratio controller connection (C12), may be used by the HCL sub-block 136 to transfer a computed parameter which is used by the HARC sub-block 134 to determine a number of pixels to be duplicated or a number of filler pixels to be inserted. The interface for C12 connection may be realized using such as custom interface signals.

In an embodiment, the horizontal control logic to filter connection (C13) may be used by the HCL sub-block 136 to transfer the filter coefficients to the HF sub-block 138. The filter coefficients may be calculated as a function of a horizontal output cumulative grid distance (HOCGD). The interface for C13 connection may be realized using custom interface signals.

In an embodiment, the system 100 may have a following dataflow. An image frame may be captured by the imaging device 102 and may be stored in the frame buffer 104 over the shared bus fabric 110. The IFR module 112 may read the frame buffer 104 over the shared bus fabric 110 and store an input image frame of the image in the LBM module 114. Further, the VSM 116 may read lines of the input image frame from the LBM module 114 and may perform a vertical scaling on the input image frame while maintaining an input aspect ratio. The VSM 116 may output the vertically scaled image frame by writing into the PBM module 118. Next, the HSM 120 may read pixels of the vertically scaled image frame from the PBM module 118 and may perform a horizontal scaling while maintaining the input aspect ratio, to generate pixels of an output image frame. The output of the HSM 120 may be a resultant image frame that may be scaled in both vertical and horizontal directions and may be transferred to the IFW module 112. The IFW module 112 may write the resultant image frame into the frame buffer 104 over the shared bus fabric 110.

In an exemplary embodiment, assuming that an input image frame may have a resolution represented as e.g., Width (W)×Height (H) where 'Width' may be a number of pixels per line and 'Height' may be a number of lines in an image frame. The above discussed system 100 may perform a scaling operation on the input image frame while maintaining an input aspect ratio. For example, the system 100 may operate on the input image frame with a rectangular resolution (e.g., Wi×Hi) and may derive an output image frame with a square resolution (e.g., Wo×Ho with Wo=Ho). This may be done while maintaining an aspect ratio of the input image frame at a same time.

Figure 2A:
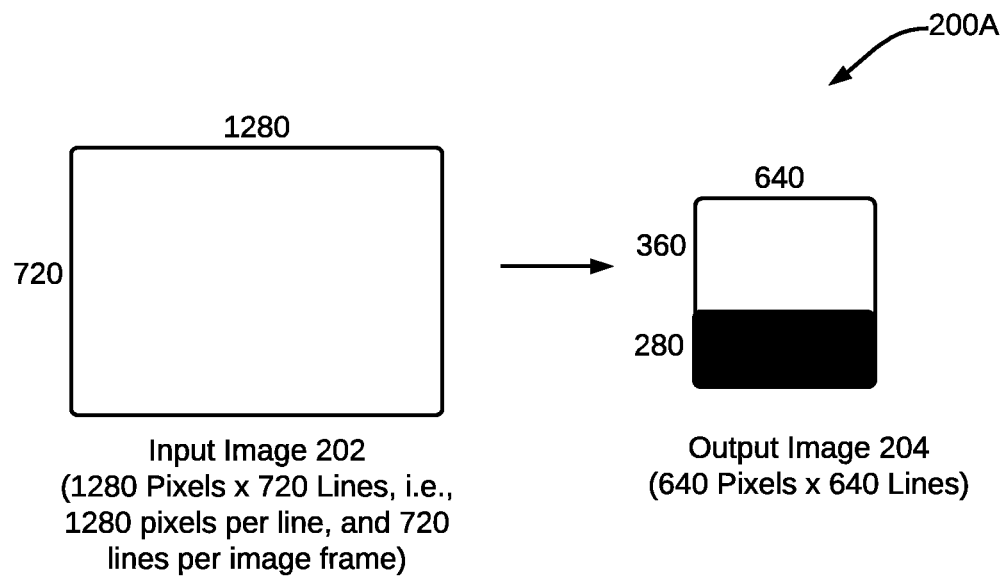
FIG. 2A illustrates an exemplary input image frame of a rectangular resolution to be scaled to obtain an output image of a square resolution, in accordance with some embodiments of the present disclosure.

With respect to the above mentioned example, referring now to FIG. 2A, for performing an exemplary scaling operation 200A on the input image frame as captured by the imaging device 102 with a rectangular resolution (e.g., 1280 pixels×720 lines, i.e., 1280 pixels per line×720 lines per image frame) to be scaled to obtain an output image of a square resolution (e.g., 640 pixels×640 lines, i.e., 640 pixels per line×640 lines per image frame), as required by the output device 108 for its operation, in accordance with some embodiments of the present disclosure.

Figure 2B:
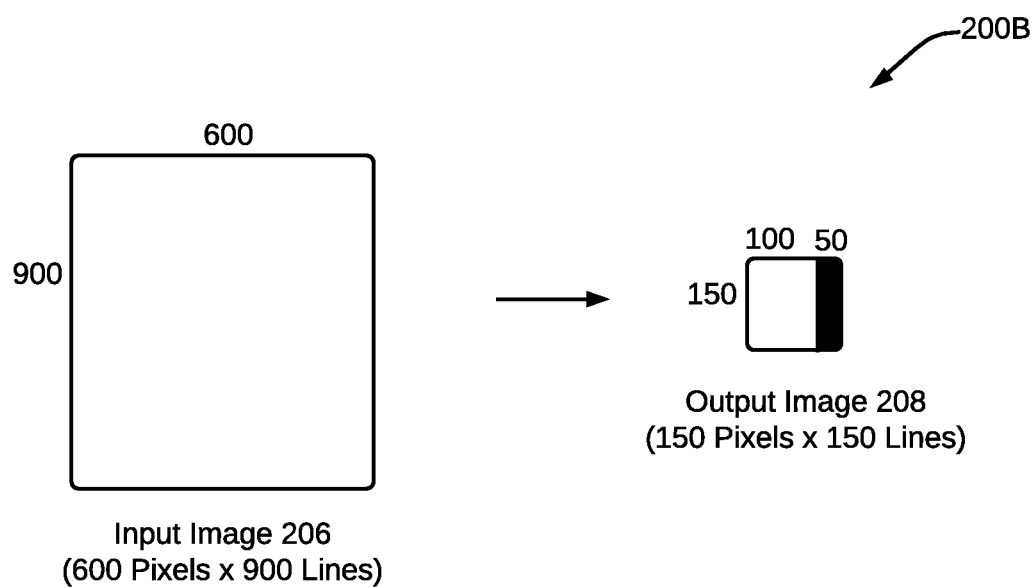
FIG. 2B illustrates another exemplary input image frame of a rectangular resolution to be scaled to obtain an output image of a square resolution, in accordance with some embodiments of the present disclosure.

With respect to the above mentioned example, referring now to FIG. 2B, for performing an exemplary scaling operation 200B on the input image frame as captured by the imaging device 102 with a rectangular resolution (e.g., 600 pixels×900 lines, i.e., 600 pixels per line×900 lines per image frame) to be scaled to obtain an output image of a square resolution (e.g., 150 pixels×150 lines, i.e., 150 pixels per line×150 lines per image frame), as required by the output device 108 for its operation, in accordance with some embodiments of the present disclosure.

With respect to the FIG. 2A and the FIG. 2B, the system 100, while performing the scaling on the input image frame, may need to maintain an input aspect ratio in the obtained output image so as to avoid introducing an image stretch distortion in the output image. In order to maintain the input aspect ratio, a similar scaling ratio may be applied in both horizontal and vertical direction of the input image frame, while ensuring that there may not be enough pixels or lines available as part of the input image frame and hence there may therefore be a need to introduce filler pixels or lines towards an end of the line or the image. Such insertion of the filler pixels or the lines may be 'adaptive' with a number and a location of the filler pixels or the lines being determined by the system 100 in real time for maintaining the input aspect ratio.

In an embodiment, the system 100 may perform a scaling operation on the input image frame (say, with a rectangular resolution) to derive an output image frame (say, with a square resolution). The scaling operation may be considered as a sequence of two operations, i.e., the vertical scaling followed by the horizontal scaling. In the vertical scaling, height of the input image frame may be scaled while leaving width of the input image frame, as captured by the imaging device 102, unaltered. The vertically scaled image frame may then be used as an input to a horizontal scalar. The horizontal scalar may operate on the pixels per line of the vertically scaled image frame to generate a final output image frame. The final output image frame may be scaled in both the vertical and the horizontal direction. In an embodiment, the generation of the output image frame using the vertical or the horizontal scaling operation may involve loading of multiple input lines or pixels and performing FIR filtering operations on the loaded multiple input lines or pixels. In an embodiment, the FIR filters used for the FIR filtering operations may be polyphase FIR filters. Further, loading and shifting of the input lines or pixels while performing the FIR filtering may be controlled using two critical parameters, i.e., a vertical output grid distance (VOGD) parameter and horizontal output grid distance (HOGD) parameter.

In an embodiment, the VOGD parameter may be calculated as a function of a vertical scaling ratio and a number of phases in a vertical FIR filter. The HOGD parameter may be calculated as a function of a horizontal scaling ratio and a number of phases in a horizontal FIR filter.

Figure 2C:
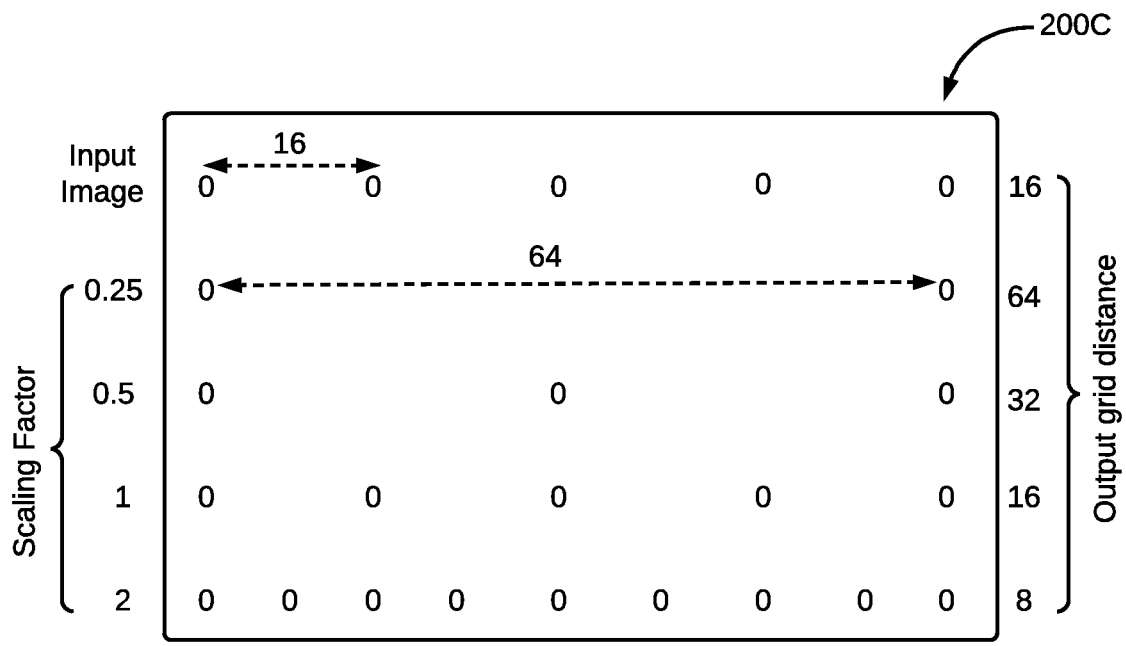
FIG. 2C illustrates an exemplary output grid distance model, in accordance with some embodiments of the present disclosure.

Referring now to FIG. 2C, an exemplary output grid distance model 200C is illustrated, in accordance with some embodiments of the present disclosure. In an embodiment, the output grid distance model may determine an output grid distance. The output grid distance may be a distance defined between two consecutive output samples, in terms of a distance determined between two consecutive input samples. By way of an example, consider the distance between two consecutive input samples as e.g., 16, which may be equivalent to a number of filter phases. In this case, an output grid distance may be 64, for a scaling factor of 0.25. The scaling factor may be calculated as (a distance between two consecutive samples/scaling factor), i.e., 16/0.25=64.

Figure 2D:
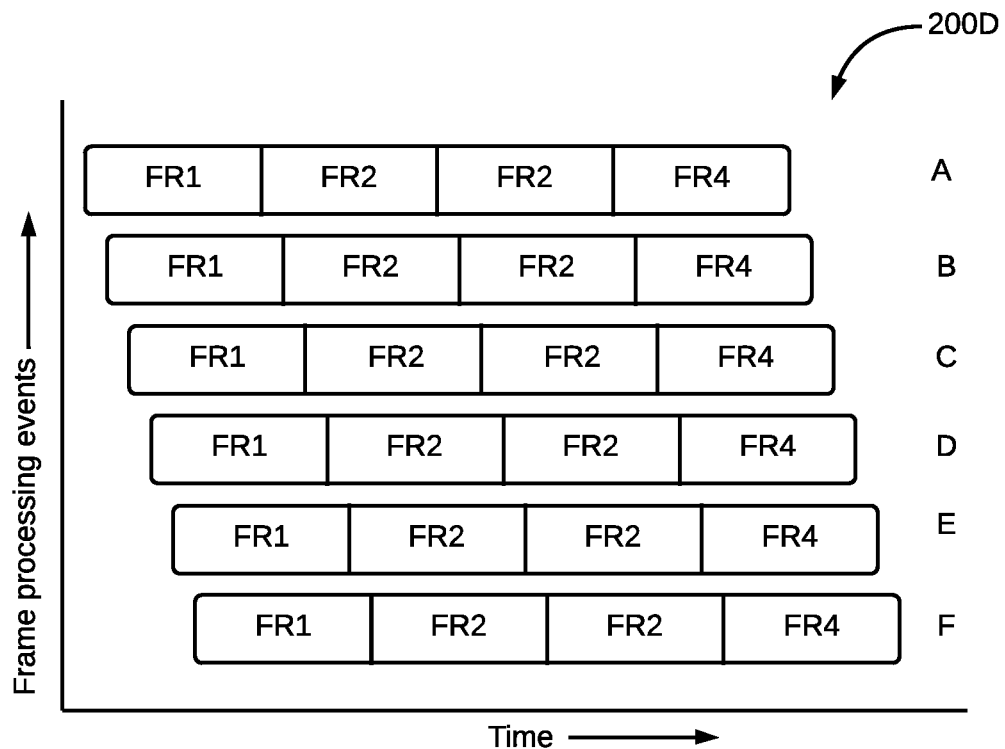
FIG. 2D illustrates an exemplary concept of performing image frame processing across different modules of the proposed system for image scaling over a time frame, in accordance with some embodiments of the present disclosure.

Referring now to FIG. 2D, an exemplary concept 200D of performing an image frame processing across different modules of the system 100 over a time frame, is illustrated, in accordance with some embodiments of the present disclosure. With respect to the exemplary concept is included a set of frames and multiple frame processing events for performing the image frame processing. In an embodiment, the set of frames may be represented as, for example, FR (N), (N+1), (N+2) . . . etc. The set of frames may represent successive image frames that may be processed further. By way of an example, the multiple frame processing events may be represented as following:

'A' that may represent input image frames that may be written by the IFR module 112 from the frame buffer 104 into the LBM module 114;

'B' that may represent the input image frames that may be read by the VSM 116 from the LBM module 114;

'C' that may represent the vertically scaled image frames that may be written by the VSM 116 into the PBM module 118;

'D' that may represent the vertically scaled image frames that may be read by the HSM 120 from the PBM module 118;

'E' that may represent the output image frame that may be written out from the HSM 120 to IFW module 126; and 'F' that may represent the output image frame that may be written out from the IFW module 126 into the frame buffer 104 over the shared bus fabric 110.

In an embodiment, the different modules of the image scaling system 100 may work concurrently. Further, the different modules of the image scaling system 100 may potentially process different image frames at a time instance.

Figure 3A:
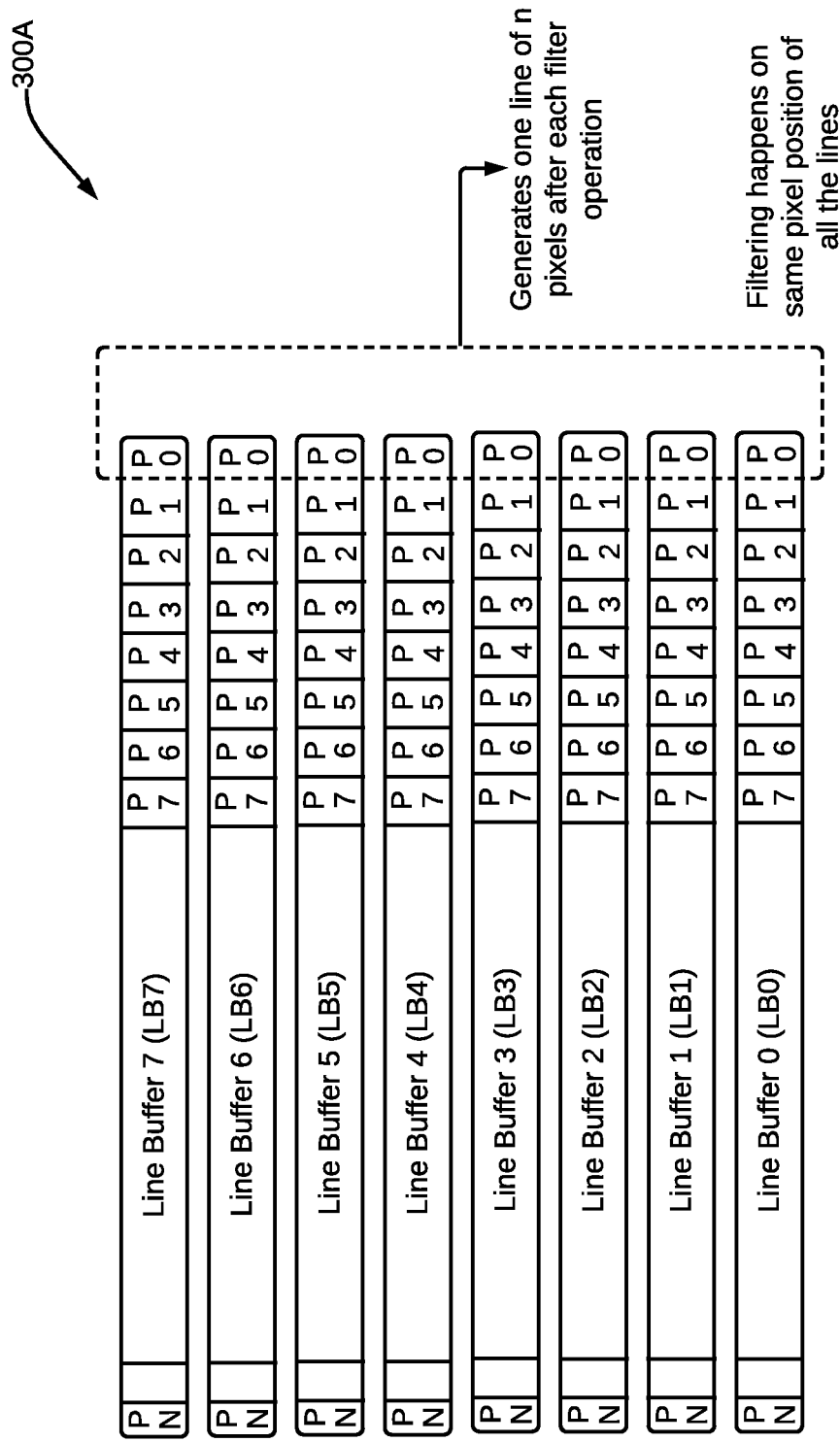
FIG. 3A illustrates a vertical scalar module (VSM) performing an exemplary vertical filtering operation for generating a vertically scaled image, in accordance with some embodiments of the present disclosure.

Referring now to FIG. 3A, an exemplary vertical filtering operation 300A performed using the VSM 116 for generating a vertically scaled image, is illustrated, in accordance with some embodiments of the present disclosure.

In an embodiment, the vertical filtering operation 300A may be performed using 8 line buffers (e.g., LB0, LB1, LB2, . . . LB7). Each of the line buffers may contain pixels (e.g., P0, P1, P2, . . . Pn). The P0 may refer to pixel-0 which may be a first pixel in line of the input image frame, P1 may refer to pixel-1 which may be a second pixel in line of the input image frame, P2 may refer to pixel-2 which may be a third pixel in line of the input image frame, and Pn may refer to pixel-n which may be last pixel in line of the input image frame. In an embodiment, the VSM 116 may perform a function of generating a vertically scaled image. The vertically scaled image may be generated while keeping horizontal resolution of the incoming image frame captured by the input device 102 intact. To generate the vertically scaled image, multiple input lines may be required to generate one output line.

In an embodiment, on every execution of the vertical filtering operation one line of 'n' pixels of the vertically scaled image may be generated. Further, the vertical filtering operation may be performed on a same pixel position of all the lines.

Figure 3B:
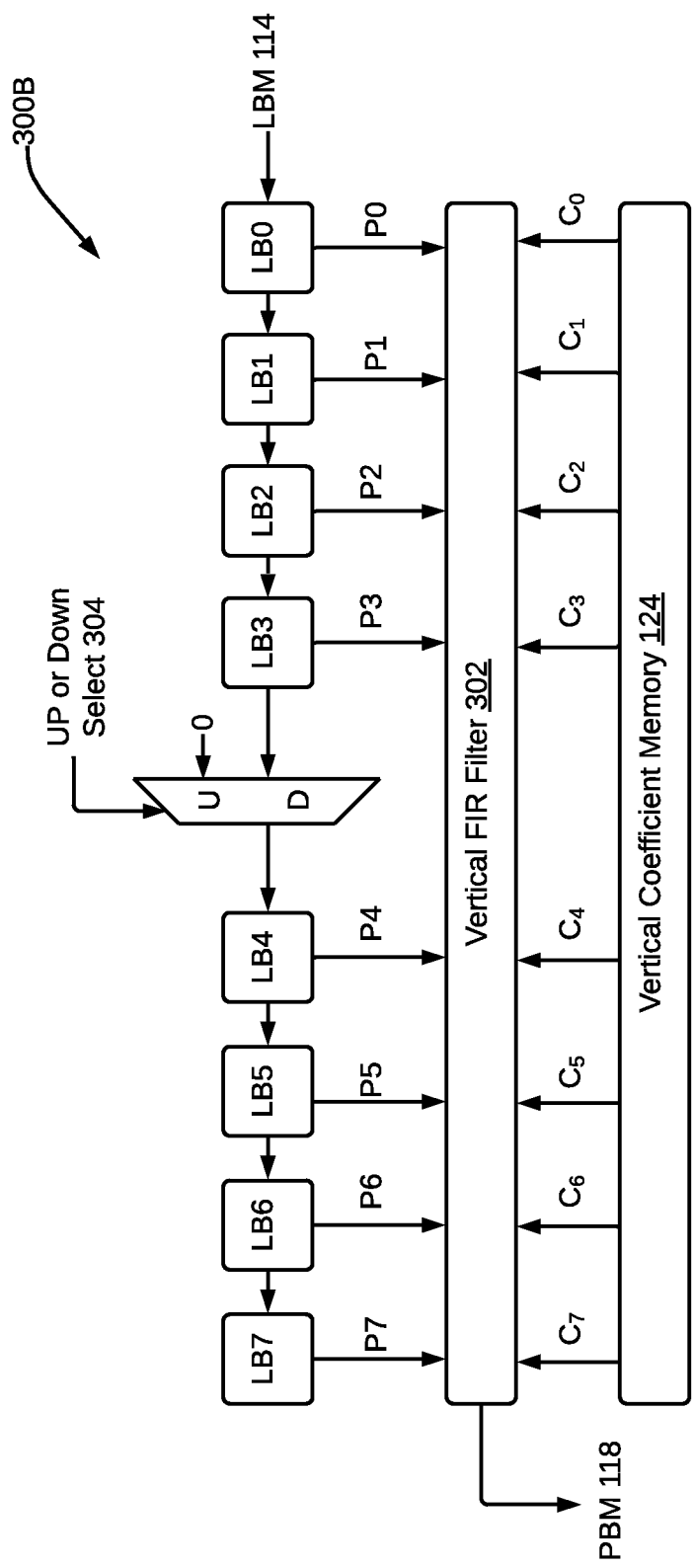
FIG. 3B illustrates a VSM that loads a required number of lines from a line buffer data memory (LBM) into line buffers (LBx) to perform an exemplary vertical scaling operation on the LBx as per a user specified image resolution, in accordance with some embodiments of the present disclosure.

Referring now to FIG. 3B, an exemplary vertical scaling operation 300B performed using the VSM 116, is illustrated, in accordance with some embodiments of the present disclosure. The vertical scaling operation 300B may load a required number of lines from a line buffer data memory (LBM) into line buffers (LBx) to perform a vertical scaling operation on the LBx as per the user specified image resolution.

In an embodiment, the VSM 116 may load the required number of lines from the LBM module 114 into multiple line buffers (e.g., LBx, where x=number of filter taps, represented as LB0, LB1, LB2, ... LB7) and may perform the vertical scaling operation on the LBx as per the user specified image resolution (e.g., I2, I5).

In an embodiment, P0, P1, P3 ... P7 may represent pixel data obtained from the line buffers LB0, LB1, LB2, ... LB7. Further, $C_0, C_1, C_2, \ldots C_7$ may represent filter coefficients, where the filter coefficients corresponding to both the upscaling operation and the downscaling operation may be stored and retrieved from the VCM module 124.

In an embodiment, a vertical polyphase FIR scaling filter 302 (interchangeably, also referred to herein as vertical FIR filter 302) may be used for performing the vertical scaling operation, where filter coefficients for the vertical FIR filter 302 may be fetched from the VCM module 124.

In an embodiment, each of the multiple line buffers (LBx) may be organized as a shift register, with each of the LBx capable of holding one complete input line. Further, each FIR filtering operation performed on the input pixels (e.g., P0, P1, P2, ... P7) in the LBx may produce one pixel of the output line. Upon completion of the FIR filtering operation on all the pixels present in the LBx, one complete output line of the vertically scaled image frame may be generated. Further, for generation of next output line, the contents of the LBx may be required to be shifted to accommodate one or more input lines, which may be needed to be loaded from the LBM module 114 into the LBx. This may continue till all the lines of the vertically scaled image are generated. The vertically scaled image may then be transferred to the PBM module 118 on a per-line basis. In an embodiment, input and output resolution of the vertically scaled image may decide the filtering operation to be either upscaling or downscaling.

In an embodiment, the filter coefficients used in implementation of the polyphase FIR scaling filter 302 may be a function of "phase" which may be computed per line. The VCM module 124 may hold the filter coefficients corresponding to all possible "phase" values. The filter coefficients corresponding to both the upscaling and the downscaling may be stored in the VCM module 124 using the interface I4. The computed per-line phase of the vertical FIR filter 302 may be used as an index to the VCM module 124, to fetch the filter coefficients over C6 connection (which may be realized using standard memory bus interface). The computed filter phase (and thereby the set of filter coefficients) may be updated at start of each of the output line and may remain unchanged for duration of the line.

In an embodiment, the VSM 116 may have the following three sub blocks:
The VF sub-block 132, which implements a polyphase FIR scaling filter 302.
The VCL sub-block 130, which may compute (a) phase of the polyphase FIR scaling filter to be used on per output line basis, and (b) shift needed in the LBx to load new input lines from LBM module 114 after generation of each of the output line. The computations performed by the VCL sub-block 130 may be a function of input and output image resolutions and number of phases in a chosen polyphase FIR scaling filter design implementation.
The VARC sub-block 128, which may ensure achieving "square" resolution at the output image frame while maintaining the aspect ratio of the input image frame. This is done by either duplicating lines from the input image frame or by inserting filler lines at end of the input image frame as these are loaded into line buffers (LBx). Operation of the VARC sub-block 128 may be adaptive as location and number of lines to be duplicated or number of filler lines to be introduced in the input image frame may be calculated by the VARC sub-block 128 on-the-fly for any of specified input aspect ratio.

As can be appreciated, the lines being duplicated or the number of filler lines to be introduced may be determined on the fly to achieve twin objectives of (a) scaling of the input image frames in the vertical direction to achieve the desired output resolution, and (b) ensuring achieving the aspect ratio of the input image frame in the output image frame.

By way of an example, a 16 phase vertical FIR filter with 8 filter taps may be used for downscaling and with 4 filter taps may be used for upscaling. To facilitate the operation to be either the upscaling operation or the downscaling operation, a set of multiplexers may be used to select as inputs to the vertical FIR filter 302 depending on the number of the filter taps. In the example, for performing the downscaling operation, the vertical FIR filter having eight line buffers (e.g., LBx) may be used, while for the upscaling operation only four line buffers (e.g., LBx) may be used with the remaining line buffers being kept unused.

With reference to FIG. 3B, in the upscaling mode of operation, zero may be fed as data for the filter taps ranging from 4-7 thereby ensuring that only filter taps 3-0 may have an effect on the output of the vertical FIR filter 302. Further, an up-down multiplexer select 304 (i.e., U or D select) may be controlled by the vertical scaling ratio which may be calculated as a function of the input image frame resolutions and the output image frame resolutions. The vertical scaling ratio of greater than or equal to one may imply a requirement of the upscaling operation while a value of less than one may indicate the downscaling operation.

In an embodiment, size of each of the line buffer (LBx) may be equal to width of the input image frame and thus each of the LBx may contain all the pixels that belong to the single line. Each of the FIR filtering operation on the input pixels in the LBx may produce one pixel of the output line and may be represented as follows.

Output pixel ($O_{(k)}$) may be represented as an average of a sum-product of pixel value ($P_{(k)(i)}$) at each filter tap and a corresponding coefficient ($C_0$)), where for each pixel in input image frame 'k', 'i' would traverse from 0 to (n−1), where n=number of filter taps, and has a value of 8 for downscaling and a value of 4 for upscaling.

Further, $C_{(i)}$=set of 8 filter coefficients for downscaling and set of 4 filter coefficients for upscaling; one per tap, and k=pixel number in each line.

In an embodiment, number of pixels per line may be identical at input and output of the VSM 116. Hence k=0 to [width−1] of input or output image frame.

Further, $O_{(k)}$=kth pixel in each output line, $P_{(k)(i)}$=kth pixel from line buffer LBi.

In an embodiment, the required number of input lines may be loaded from the LBM module 114 into the line buffers (LBx) in order to generate each of the output line. However, this operation, depending on the scaling ratio, may potentially require higher number of lines than that are available as part of input image frame in LBM. In other words when the last line of input image frame is reached before generating the last line of output image frame, the VF sub-block 132 may operate in conjunction with the VARC sub-block 128 to handle such a scenario. This is done by either duplicating an existing line already present in the line buffer (LBx) or by loading a new filler line into all of the line buffers (LBx). The filler lines so introduced may not adversely impact an object detection or classification accuracy of the output device 108 (having Convolutional Neural Network (CNN) engine), in terms of either false positives or false negatives.

Figure 4A:
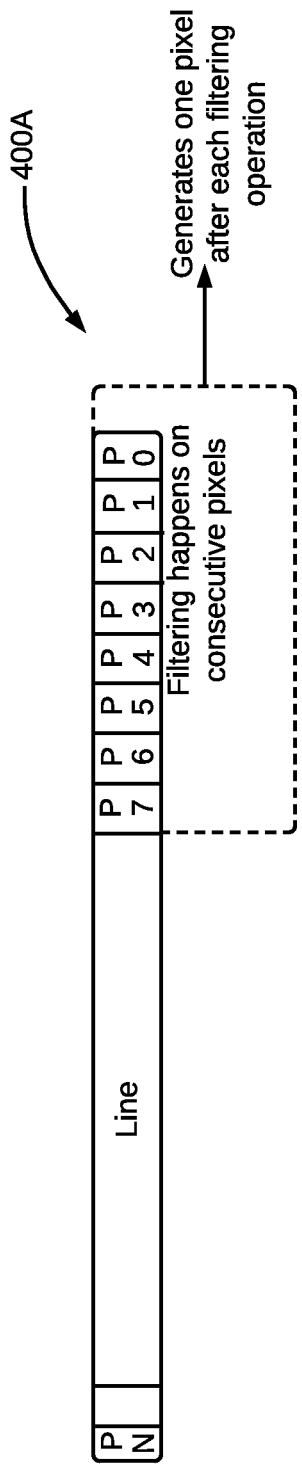
FIG. 4A illustrates a horizontal scalar module (HSM) performing an exemplary horizontal filtering operation for generating a horizontally scaled image, in accordance with some embodiments of the present disclosure.

Referring now to FIG. 4A, an exemplary horizontal filtering operation 400A performed using the HSM 120 for generating a horizontally scaled image, is illustrated, in accordance with some embodiments of the present disclosure.

In an embodiment, the horizontal filtering operation 400A may be performed on a line having pixels P0, P1, P2, Pn. In some embodiments, the pixels P0, P1, P2, Pn may be determined from the line of the vertically scaled image frame present in the PBM module 118. In an embodiment, the horizontal filtering may be performed on a consecutive set of pixels of the line to generate one pixel after each of the filtering operation.

In an embodiment, each of the output line from the VSM 116 (i.e., vertically scaled with respect to the input image frame) may pass through the HSM 120 so as to undergo horizontal scaling. To achieve this, the HSM 120 may load multiple pixels corresponding to the line in the PBM module 118 to generate one pixel of the corresponding horizontally scaled line. The configured input and output resolution may determine the scaling operation to be either the upscaling operation or the downscaling operation.

Figure 4B:
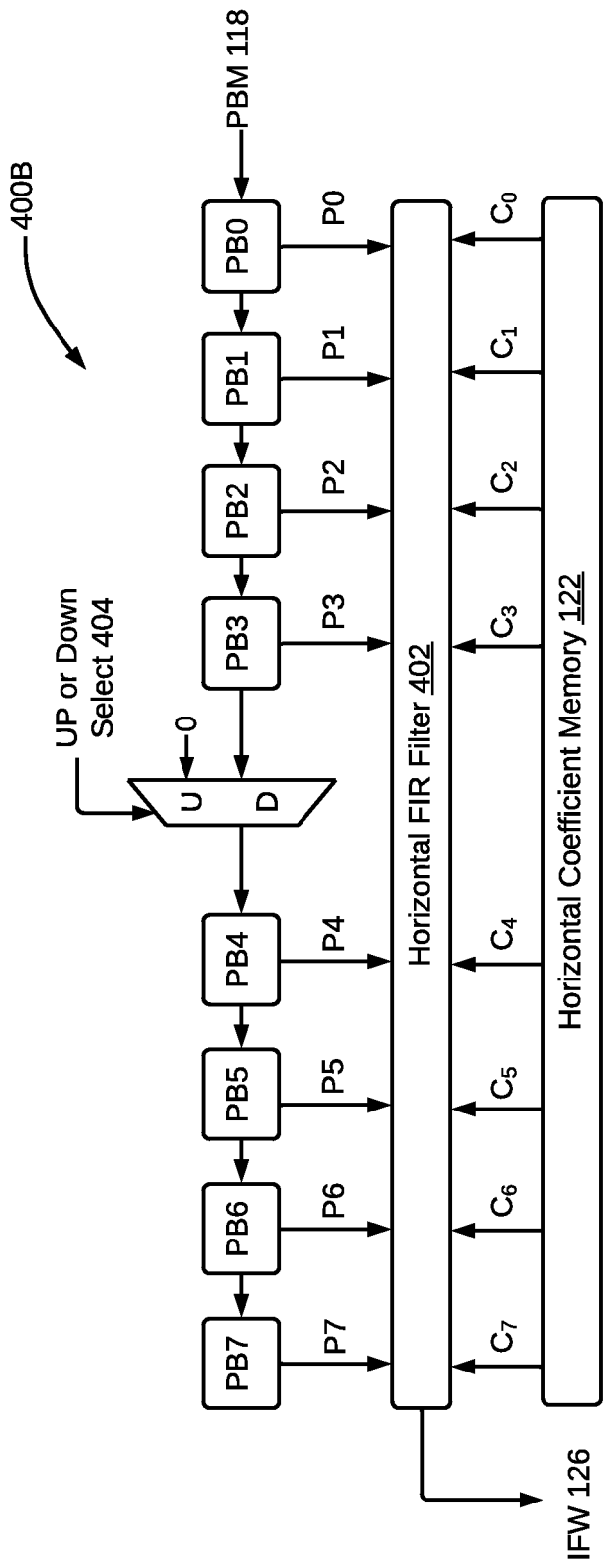
FIG. 4B illustrates a HSM that loads a required number of pixels, of each fetched vertically scaled line, from a pixel buffer memory (PBM into the pixel buffers (PBx) to perform an exemplary horizontal scaling operation on a per-pixel basis, in accordance with some embodiments of the present disclosure.

Referring now to FIG. 4B, an exemplary horizontal scaling operation 400B performed using the HSM 120 is illustrated, in accordance with some embodiments of the present disclosure. The horizontal scaling operation 400B may load a required number of pixels, of each fetched vertically scaled line, from the PBM module 118 into the pixel buffers (PBx) to perform the horizontal scaling on a per-pixel basis.

With respect to FIG. 4B for each output line, the HSM 120 may read the PBM module 118 to fetch each vertically scaled line and load the required number of pixels into the pixel buffers (PBx, where x=number of filter taps) to perform horizontal scaling on a per-pixel basis. A horizontal polyphase FIR scaling filter 402 (interchangeably, also referred to herein as horizontal FIR filter 402) may be used for this purpose, with its filter coefficients being fetched from the HCM module 122. The pixel buffers (PBx) may be organized as a shift register with each PBx holding one pixel. Each FIR filtering operation may output one pixel of the output line. Upon completion of each of the FIR filtering operation for generation of a next pixel in the output line, the contents of the pixel buffers (PBx) may need to be shifted to accommodate one or more pixels from the PBM module 118 which may be loaded into the PBx. This may continue till all the pixels of each of the line of the horizontally scaled image are generated. The output of HSM 120 may be an image frame which is scaled in both vertical and horizontal directions with respect to the original input image frame.

The filter coefficients used in the polyphase FIR scaling filter implementation may be a function of the "phase" which may be computed per pixel. The HCM module 122 may hold the filter coefficients corresponding to all possible "phase" values. The filter coefficients corresponding to both upscaling operation and downscaling operation may be stored in the HCM module 122 using the interface I3 (which can be realized using e.g., a standard AMBA APB interface). The computed per pixel "phase" of the horizontal FIR filter may be used as an index to the HCM module 122, to fetch the filter coefficients over C5 connection (which may be realized using a standard memory bus interface). The computed phase (and thereby the set of filter coefficients) may be updated for each pixel of the output image frame.

In an embodiment, the HSM 120 may have following three sub-blocks:

The HF sub-block 138 may implement a standard polyphase FIR filter.

The HCL sub-block 136 may compute (a) a phase of the FIR filter to be used on per output pixel basis, and (b) a shift needed in the PBx to load new pixels from the PBM module 118 after generation of each pixel of the output line. The computations performed in the HCL sub-block 136 may be a function of the input and output image resolutions and a number of phases in a chosen polyphase FIR scaling filter design implementation.

The HARC sub-block 134 may ensure providing a "square" resolution at the output image frame while maintaining an aspect ratio of the input image frame, by either duplicating previous pixels from a given line of the image frame in the PBM module 118 or by inserting filler pixels at the end of the line of image frame in the PBM module 118 as it gets loaded into pixel buffers (PBx). The operation of the HARC sub-block 134 may be adaptive, i.e., location and number of pixels being duplicated or the number of filler pixels to be introduced may be calculated by the HARC sub-block 134 on-the-fly for any of the input aspect ratio.

As will be appreciated, the location and number of pixels being duplicated or the number of filler pixels to be introduced may be calculated on-the-fly to achieve twin objectives of (a) scaling in the horizontal direction to achieve the desired output resolution, and (b) ensuring the aspect ratio of input image frame at the output image frame.

By way of an example, a 16 phase standard FIR filter with 8 filter taps may be used for downscaling and the filter with 4 filter taps may be used for upscaling. To facilitate execution of the operation to be either upscaling or downscaling, a set of multiplexers may be used to select the inputs to the FIR filter depending on the number of the filter taps. In the example, for a downscaling FIR filter, eight pixel buffers (PBx) may be used, while for the upscaling only four pixel buffers (PBx) may be used with remaining pixel buffers (PBx) being left unused.

Referring to FIG. 4B, in the upscaling mode of operation, zero may be fed as data for the filter taps 4-7 thereby ensuring that only filter taps 3-0 effect the output of the FIR filter. With reference to FIG. 4B, the up-down multiplexer select 404 (U or D select) may be controlled by the horizontal scaling ratio which may be calculated as a function of input and output image frame resolutions. A horizontal scaling ratio of greater than equal to one may imply requirement of the upscaling operation while a value of less than one may indicate the downscaling operation. Each pixel buffer (PBx) may hold one pixel of the image frame from the PBM module 118. Further, upon execution of each of the FIR filtering operation, pixels in the PBx may produce one pixel of an output horizontally scaled line and may be represented as follows.

In an embodiment, output pixel ($O_{(m)}$) may be represented as an average of a sum-product of pixel value ($PB_{(i)}$) at each filter tap and a corresponding coefficient ($C_i$), where for each pixel in the output image frame 'm', 'i' may traverse from 0 to (n−1), and where n=number of filter taps. For downscaling operation n=8, and for the upscaling operation n=4.

Further, $C_{(i)}$=set of 8 filter coefficients for downscaling and set of 4 filter coefficients for upscaling; one per tap. In an embodiment, m=pixel in the output image frame, and may range from 0 to [width−1] of the output image frame. Further, $O_{(m)}=m^{th}$ pixel in the line corresponding to the output image frame. Also, $PB_{(i)}$=pixels from input or filler line loaded into pixel buffer as computed by HCL sub-block 136.

In an embodiment, the required number of pixels may be loaded into the pixel buffers (PBx) in order to generate each pixel of the output line. However, this operation, depending on the scaling ratio, may potentially require higher number of pixels than that are available as part of the input line from the vertically scaled image in the PBM module 118. The HF sub-block 138 may operate in conjunction with the HARC sub-block 134 to handle such a scenario by either duplicating an existing pixel already present in the pixel buffer (PBx) or by loading filler pixels into all of the pixel buffers (PBx). The filler pixels so introduced may not adversely impact object detection or classification accuracy of the output device (e.g., CNN engine), in terms of either false positives or false negatives.

In an embodiment, the loading and shifting of the buffers for the FIR filtering operation in the HF sub-block 138 may be identical to that in the VF sub-block 132 with a clarification that the HF sub-block 138 may operate on pixels stored in the pixel buffers (PBx) while the VF sub-block 132 operates on lines stored in the line buffers (LBx). Also, the VSM 116 and the HSM 120 may operate in parallel, with the HSM 120 being triggered as soon as a complete line gets transferred from the VSM 116 to the PBM module 118.

Since identical polyphase FIR implementation is used in both vertical and horizontal directions, the filter coefficients stored in VCM and HCM would be identical. However, since VSM and HSM operate in parallel, at any given point of the time the instantaneous phase of the vertical and horizontal filters can be different and hence the coefficients being fetched from VCM and HCM can be different.

Also, since the incoming image contains multiple components per pixel (for example, RGB, YUV, etc.), multiple FIR filters are needed, with each operating on one of the components in parallel. For example, if the incoming image is a RGB, then VSM and HSM each consists of 3 FIR filters operating in parallel.

Figure 5A:
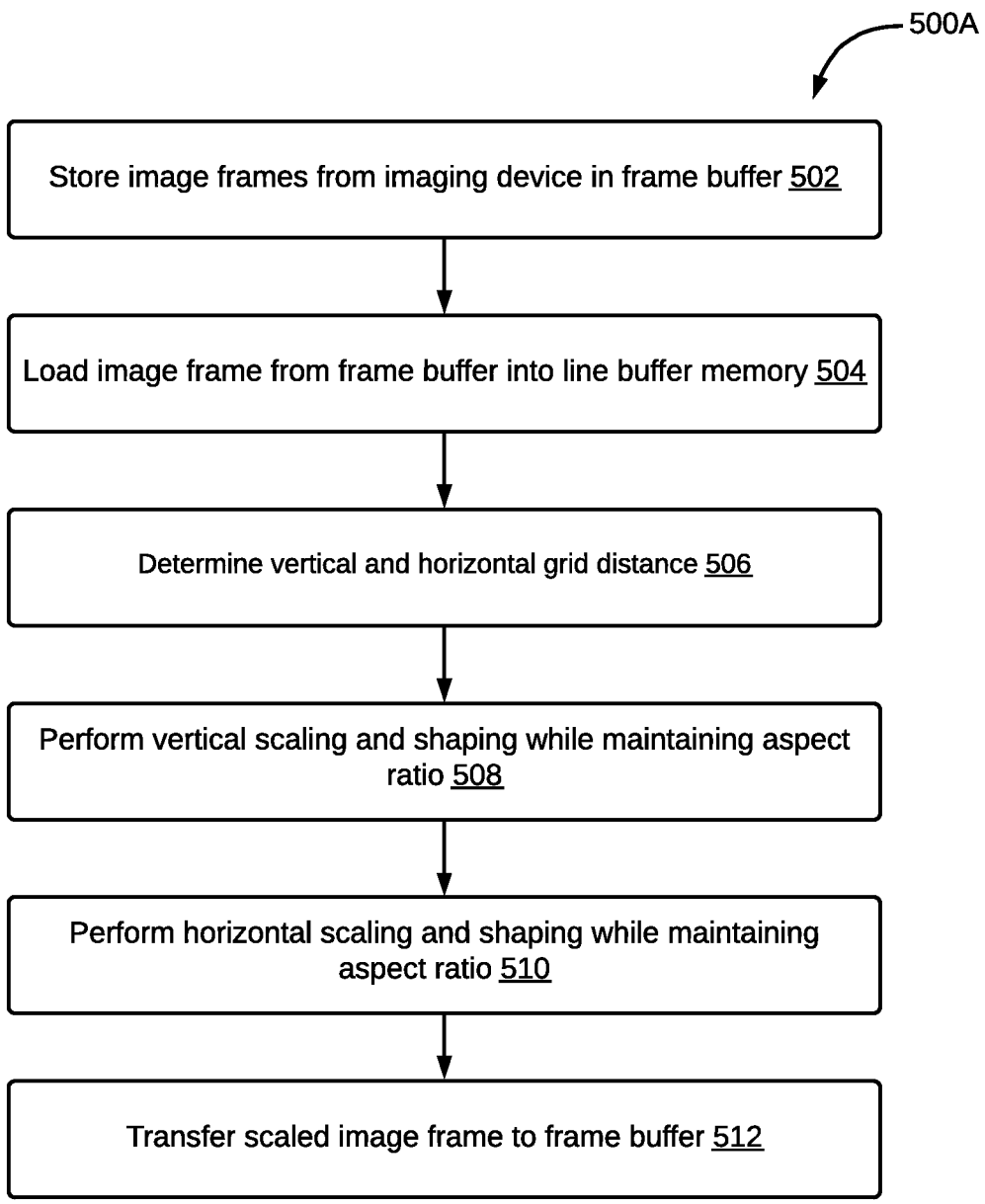
FIG. 5A illustrates a flow diagram of an exemplary process for implementing real-time upscaling or downscaling of input image frames to output image frames, while maintaining an aspect ratio of the input image frames, in accordance with some embodiments of the present disclosure.

Referring now to FIG. 5A, a flow diagram 500A of an exemplary process for implementing real-time upscaling or downscaling of input image frames to output image frames, while maintaining an aspect ratio of the input image frames, is illustrated, in accordance with some embodiments of the present disclosure. The exemplary process discloses a mechanism for implementing real-time upscaling or downscaling of the input image frames to obtain the output image frames, while maintaining the aspect ratio of the input image frames. As can be appreciated by those skilled in the art, the disclosed mechanism may be extended to receiving a video feed as an input, where the input video feed may be visualized as a series of image frames.

With reference to FIG. 5A, at step 502, multiple received image frames (as received from the imaging device 102) may be stored in the frame buffer 104. At step 504, each of the image frames of the multiple received image frames may be read from the frame buffer 104. The IFR module 112 may read an image frame from the frame buffer 104 (through I1 interface) and store the read image frame in the LBM module 114 over the C1 connection. The C1 connection may be realized using a standard AXI interface. Further, a user specified input image resolution (as provided through the interface I2) may be used to calculate an amount of data which needs to be transferred per image.

In an embodiment, at step 506, a vertical output grid distance (VOGD) and a horizontal output grid distance (HOGD) may be determined. The VOGD may be a function of a number of vertical filter phases (NVFP) and a vertical scaling ratio (VSR). The HOGD may be a function of a number of horizontal filter phases (NHFP) and a horizontal scaling ratio (HSR). In an embodiment, the VOGD and the HOGD may have a fixed value for a given FIR filter design implementation and a scaling ratio. Further, the VOGD and the HOGD may be computed in the VCL sub-block 130 and the HCL sub-block 136 respectively, and the computation may be done as follows:

VOGD may be a ratio of the NVFP and the VSR; and

HOGD may be a ratio of the NHFP and the HSR

Further, to generate the final output image frame with the square resolution having the aspect ratio retained as in the input image frame, an identical scaling ratio may be applied to both vertical and horizontal directions of the input image frame. Hence, the HSR may have a same value as the VSR. Also, since an identical FIR filter design implementation may be used in both the vertical and the horizontal directions, the NVFP may be same as the NHFP. Therefore, it follows that the VOGD and the HOGD may be of a same value.

In an embodiment, the VOGD and the HOGD may be real numbers, which may have both an integer part as well as a fractional part. By way of an example the VOGD and the HOGD may be represented by binary 32 bits with most significant 16 bits allocated for the integer part, while the least significant 16 bits allocated for the fractional part.

By way of an example, consider say a vertical scaling ratio of 1.25 and a 16 phase FIR filter, in which case, the VOGD may be determined as 16/1.25=12.8 and may be represented as 0x00000008 where the most 16 significant bits 0x000C may denote 12 which is the integer part while the lower 16 bits 0x0008 may denote 8 which is the fractional part. Further, calculated and the determined VOGD and the HOGD may be used for all further operations as described in the step 508 and the step 510.

In an embodiment, different parameters used in computation of the VOGD and the HOGD may be described as below:
Number of lines in input image frame (NUM_IP_LINES)
Number of pixels in input image frame (NUM_IP_PIXELS)
Number of lines in output image frame (NUM_OP_LINES)
Number of pixels in output image frame (NUM_OP_PIXELS)
Number of vertical filter phases (NVFP)
Number of horizontal filter phases (NHFP)
Vertical Scaling Ratio (VSR)
Horizontal Scaling Ratio (HSR)
In an embodiment, the VSR may be defined as follows:
If the NUM_IP_LINES is greater than the NUM_IP_PIXELS then VSR is the ratio of NUM_OP_LINES and NUM_IP_LINES, and
If the NUM_IP_LINES is less than (or equal to) NUM_IP_PIXELS then VSR is the ratio of NUM_OP_LINES and NUM_IP_PIXELS.

In an embodiment, the VSR of greater than or equal to one may correspond to the upscaling operation while the VSR of less than one would correspond to the downscaling operation.

In an embodiment, the HSR may be defined as follows:
If the NUM_IP_LINES is greater than the NUM_IP_PIXELS then the HSR may be a ratio of NUM_OP_PIXELS and NUM_IP_LINES.
If the NUM_IP_LINES is less than (or equal to) NUM_IP_PIXELS then the HSR may be the ratio of NUM_OP_PIXELS and NUM_IP_PIXELS.

In an embodiment, the HSR value of greater than or equal to one would correspond to the upscaling operation while the HSR of less than one would correspond to the downscaling operation.

In an embodiment, at step 508, a vertical scaling and shaping of the input image frame may be performed while maintaining an aspect ratio of the input image frame. The sequence of operations performed at step 508 are illustrated in detail in FIG. 5B and are described in greater detail with reference to FIG. 5B herein below.

At step 508, the VSM may generate each of a line of a vertically scaled image and may transfer it to the PBM module 118 over the C3 connection. The different sub-blocks of the VSM 116 such as VF sub-block 132, VCL sub-block 130, and VARC sub-block 128 may be involved in the scaling operation and may operate in co-ordination of each other. The functionality of the VCL sub-block 130 may be to compute shift till input line (STIL) parameters, vertical filter phase (VFP) parameters and VOCGD parameters in addition to fetching one or more coefficient parameters. The VARC sub-block 128 may be involved in maintaining the aspect ratio of the input image frame. The VF sub-block 132 may deal with the vertical FIR filter implementation.

Further, the VCL sub-block 130 may also determine a combination of the input lines needed and consequently the number of input lines which may need to be shifted into the line buffers (LBx). For each line of vertically scaled output image frame, the VCL sub-block 130 as a function of the STIL, may determine the line buffers (LBx) which may be loaded from the LBM module 114. Based on the VFP, the coefficients to be used by vertical FIR filter may be fetched from the VCM module 124. In addition, the VF sub-block 132 may perform FIR filtering operations on a per pixel basis upon data being present in line buffers (LBx), to generate the line data corresponding to the output image frame.

In an embodiment, at step 510, the sequence of operations for performing horizontal scaling and shaping while maintaining the aspect ratio may be performed in the HSM. The sequence of operations performed at step 510 are illustrated in detail in FIG. 5C and are described in greater detail with reference to FIG. 5C herein below.

At step 510, the HSM may move through each line of the vertically scaled image from the pixel buffer memory (PBM) over the C4 connection and loads the required number of pixels of each line into the pixel buffers (PBx) to perform horizontal scaling using a horizontal FIR filter. Different sub-blocks of the HSM such as a HF sub-block 138, a HCL sub-block 136 and a HARC sub-block 134 may be involved in this operation and may operate in co-ordination. The functionality of the HCL sub-block 136 may be to compute Shift till input pixel (STIP) parameters, horizontal filter taps (HFT) parameters, and HOCGD parameters in addition to fetching coefficient parameters. The Horizontal Aspect Ratio Control (HARC) may be involved in maintaining an aspect ratio while HF sub-block 138 may deal with the horizontal FIR filter implementation.

Further, the HCL sub-block 136 may determine a combination of input pixels needed and consequently a number of pixels which may need to be shifted into pixel buffers (PBx). For each pixel of the output image frame, the HCL sub-block 136 may as a function of the STIP determine the pixel buffers (PBx) to be loaded from the PBM module 118. Based on HFP, the coefficients to be used by a horizontal FIR filter may be fetched from the HCM module 122 over the C5 connection. The contents of the HCM module 122 may be user configurable over interface I3. The HF sub-block 138 may perform FIR filtering operations on a per pixel based upon data present in pixel buffers (PBx) to generate pixels of the output image frame.

At step 512, the output scaled image frame may be transferred back to the frame buffer 104. In an embodiment, the image frame write (IFW) module 112 may transfer output of the HSM 120 into the frame buffer 104 over the shared bus fabric 110. Connection C7 and interface I6 may be used for this purpose. The user specified output image resolution (through interface I5) may be used to calculate the amount of data which needs to be transferred per image.

Figure 5B:
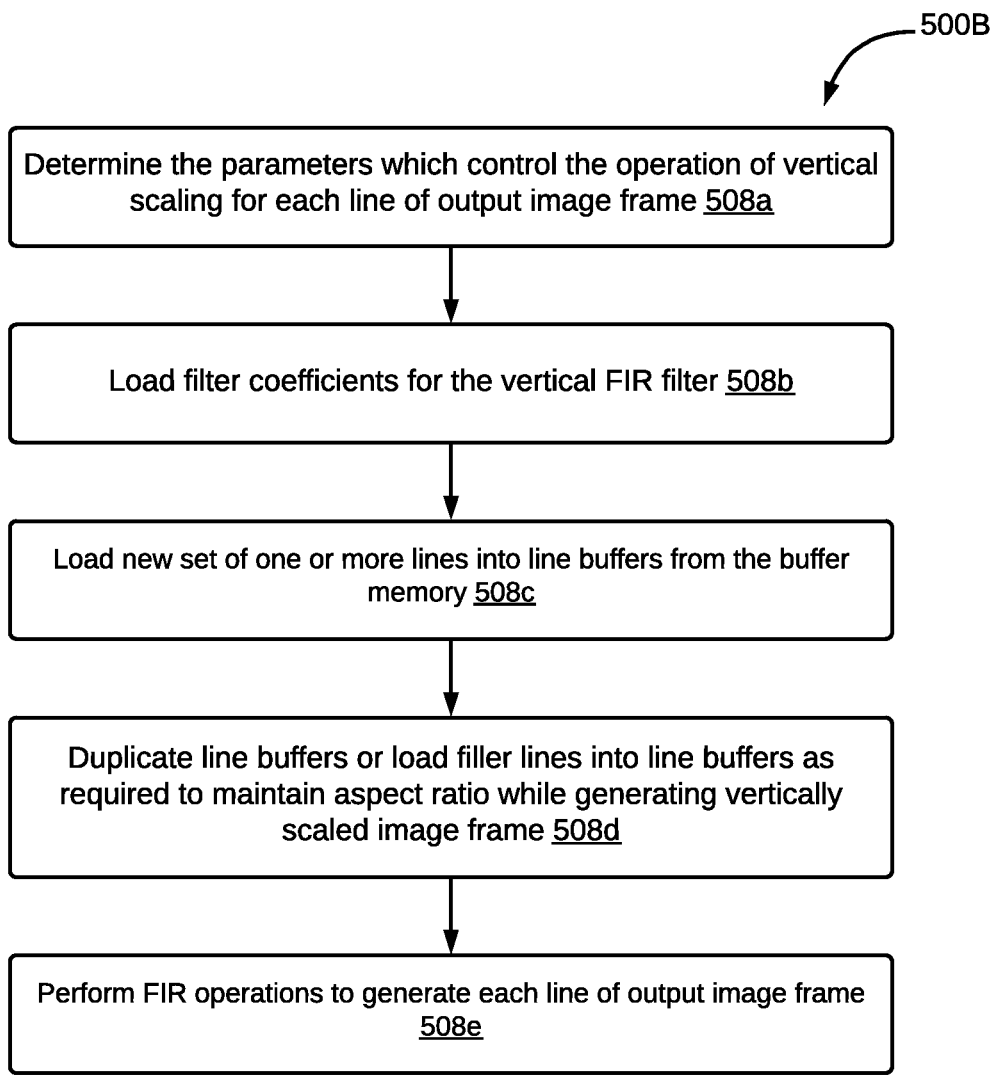
FIG. 5B illustrates a flow diagram of an exemplary process for implementing vertical scaling on the input image frames while controlling an aspect ratio, in accordance with some embodiments of the present disclosure.

Referring now to FIG. 5B, a flow diagram 500B of an exemplary process for implementing vertical scaling on the input image frames while controlling an aspect ratio, is illustrated, in accordance with some embodiments of the present disclosure.

With respect to FIG. 5B, at step 508A, calculation of the VOCGD parameters, the VFP parameters, and the STIL parameters may be performed. In an embodiment, Vertical filter taps (VFT) may denote the number of filter taps present in the vertical FIR filter. For example, consider use of a 16 phase FIR filter with 8 filter taps for the downscaling and 4 filter taps for the upscaling. This may also be represented as the VFT used for the downscaling is 8, and the VFT used for the upscaling is 4. In an embodiment, if an identical FIR filter implementation is used in both vertical and horizontal directions of the input image frame, then the number of vertical filter taps may be same as the number of horizontal filter taps.

In an embodiment, the number of binary bits to denote vertical filter phases (NBVFP) may denote a number of binary bits needed to represent the VFP. For example, NBVFP=4 when NVFP=16. Further, if an identical polyphase FIR scaling filter is used, then the number of binary bits needed to represent the filter phases in both the vertical and the horizontal FIR filters may be same.

In an embodiment, the VOCGD may be a function of the vertical output grid distance (VOGD) and may be computed as:

The VOCGD (of a new output line)=a sum of the VOCGD (of a previous output line) and the VOGD                    Equation (1)

In an embodiment, the VOCGD may be set to zero at beginning of each of the output image frame and may be updated for each new output line generated by the VSM 116. The VOCGD computed at the beginning of each of the output line may remain unchanged till end of the line.

In an exemplary embodiment, the VOCGD may be defined to be 32 bits with most significant 16 bits allocated for an integer part, while the least significant 16 bits allocated for a fractional part. Thus, the Integer part of the binary bit ranges from bit 31 to bit 16, most significant bit of Integer part (MSINT) is bit 31, least significant bit of Integer part (LSINT) is bit 16, and a fractional part of the binary bit ranges from bit 15 to bit 0.

In another exemplary embodiment, when the VOCGD is 30.2, then the VOCGD may be represented as 0x001E0002 where the most 16 significant bits 0x001E may denote 30 which is the integer part while the lower 16 bits 0x0002 may denote 2 which is the fractional part.

In an embodiment, the Vertical filter phase (VFP) may represent a phase of a vertical polyphase FIR filter. The VFP may be a function of the VOCGD, and the NVFP. The VFP may be computed as follows:

VFP is equal to (most significant 16bits of VOCGD) modulus (NVFP)             Equation (2)

Further, since the VOCGD may be updated for every new output line corresponding to the output image frame, it may follow that the VFP may be recomputed for every new line of the output image frame generated by the VSM.

As explained above, the VSM may require multiple input lines to perform the scaling and generate a line of the output image frame. To achieve this, the input lines may be shifted into the line buffer (LBx) from the LBM module 114. The STIL may denote the maximum line number of the input image frame, which may need to be present in the line buffer (LBx) in order to generate a given output line and thus controls the shifting of the required lines from the LBM module 114 to the line buffer (LBx). The STIL may be a function of the VOCGD and the VFT. The STIL may be updated at beginning of each new output line and may remain unchanged till end of the line.

In an embodiment, the STIL may be computed for each line of the output image frame as:
STIL=the sum of value of (bit range) of the VOCGD and half of the VFT, where bit range=MSINT to (sum of LSINT and NBVFP)

In an embodiment, for the downscaling where an 8 tap filter with 16 phases is used:

The STIL may be represented as a sum of value of (bits 31 to 20) of the VOCGD and half of the VFT                 Equation (3a)

In another embodiment, for the upscaling where a 4 tap filter with 16-phases is used:

The STIL may be represented as a sum of value of (bits 31 to 20) of the VOCGD and half of the VFT                 Equation (3b)

In an embodiment, at step 508B, the filter coefficients determined at step 508A may be loaded. By way of an example, a polyphase FIR scaling filter may have 16 phases, with 8-taps for downscaling and 4-taps for upscaling, with each filter coefficient being 8-bit wide. In such a case, the VFP may take values between 0 and 15. This may be computed by performing a 'modulus 16' operation on an integer part of the VOCGD. Further, using the VFP as an index, coefficients may be fetched from the VCM module 124 and may be used in the FIR filter operation.

Also, for example, the filter coefficients may be represented using 8 bits with the most significant bit representing the sign (e.g., 0 for positive and 1 for negative) and remaining seven bits representing the value. The coefficient table in the VCM module 124 for downscaling may be organized as 16×8 (i.e., phase×taps) with each coefficient being 8 bits wide (i.e., 1b for sign, 7b for value). The coefficient table in the VCM module 124 for upscaling may be organized as 16×4 with each coefficient being 8 bits wide (i.e., 1b for sign, 7b for value).

Figure 6A:
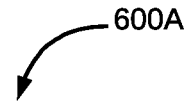
FIG. 6A illustrates exemplary filter coefficients corresponding to an 8-tap polyphase FIR scaling filter used for downscaling input image frames, in accordance with some embodiments of the present disclosure.

Referring now to FIG. 6A, exemplary filter coefficients for 16 phase 8-tap polyphase FIR scaling filter used for downscaling input image frames, is illustrated, in accordance with some embodiments of the present disclosure. Similarly, referring now to FIG. 6B, exemplary filter coefficients for 16 phase 4-tap polyphase FIR scaling filter used for upscaling input image frames, is illustrated, in accordance with some embodiments of the present disclosure.

In an embodiment, at step 508C, new lines may be loaded into the line buffer (LBx) and existing contents that the LBx constitutes may be shifted. For generation of each of the output line, the existing contents of the LBx may be shifted to accommodate one or more input lines from the LBM module 114 which may need to be loaded into the LBx. The shifting may be controlled by the VCL sub-block 130 based on the STIL parameter computed at step 508A. This is illustrated in tabular form in FIG. 8A, where contents of the LBx needed for generation of the output line-0 may be [4-3-2-1-0-0-0-0] while contents of the LBx needed for generation of the output line-1 may be [8-7-6-5-4-3-2-1] where each element may represent the input line being fetched from the LBM module 114.

In an embodiment, at step 508D, operation of the VARC involving duplication of lines and insertion of the "filler" lines to maintain the input aspect ratio at the output image frames may be performed. The VARC may work in conjunction with the VF sub-block 132 and the VCL sub-block 130. Further, the main functionality of the VARC may be to ensure the following: (a) the output image frame may have the same aspect ratio as the input image frame, and (b) to generate the output image frame with a square resolution while the input image frame has a rectangular resolution. The VARC may handle special considerations which may arise at beginning and end of the output image frame summarized under as 3 cases below:

Case-1: The STIL may be less than the VFT. Such a condition may happen at the beginning of the output image frame.

Case-2: The STIL may be greater than (NUM_IP_LINES-1) but the difference is less than half of the VFT. This condition happens during generation of the output lines towards end of the vertically scaled image frame.

Case-3: The STIL may be greater than (NUM_IP_LINES-1) with the difference being greater than or equal to half of the VFT. This condition typically happens during generation of the output lines towards end of the vertically scaled image frame.

In an embodiment, the operation of the VARC in each of the above mentioned cases may be summarized as follows:

Case-1: If STIL is less than the VFT, then there may not be enough input lines to fill all the line buffers (LBx) needed for the FIR operation. In such a case, the first (VFT-STIL) line buffers may hold identical data, i.e., duplication. For example, if STIL is 4 and VFT is 8 then the line buffers (LBx) may need to be loaded as follows:

(LB7-LB6-LB5-LB4-LB3-LB2-LB1-LB0) may be filled with lines (4-3-2-1-0-0-0-0). This implies that LB0, LB1, L2, LB3 may all hold line 0 while the LB4 may hold line 1, LB5 may hold line 2, LB6 may hold line 3 and LB7 may hold line 4. The generation of line 0 of the output image frame is illustrated in the table at FIG. 8A, where STIL is 4 while 8 lines may be required to fill up all the line buffers (LBx).

Case-2: If STIL is less than sum of (NUM_IP_LINES-1) and half of the VFT, then the last line in the input image frame may be reached before generating last line of the output image frame. In such a case, the "last" line of input image frame may be copied into the line buffers (LBx) as needed. This is illustrated in FIG. 8A for generation of the line 7 of the output image frame, where the STIL is 32 while the (NUM_IP_LINES-1) is 29. Hence line 29 may be copied into LB7, LB6 and LB5.

Case-3: If the STIL is greater than or equal to a sum of (NUM_IP_LINES-1) and (half of the VFT), then the last line in the input image frame may be reached before generating the last line of the output image frame. In such a case, "filler" data is inserted into "all" the line buffers (LBx). This is illustrated in FIG. 8B for generation of the line 6 or the line 7 of the output image frame, where the STIL is 22 or 25 while the (NUM_IP_LINES-1) is 17.

In an embodiment, the "filler" data in the VARC may have a fixed value for all pixels constituting a line. For example, ZERO may be loaded into the LBx as "filler" line data and this may be represented as "null line" (NL) in the tables illustrated in FIGS. 8A-8D. The intent of this insertion may be to ensure scaling, from rectangular to square resolution, while maintaining the input aspect ratio in the output image frame. ZERO may be chosen as "filler" since any other data may distort the scaled image and thereby adversely impact the object classification or detection accuracy of the output device 108 (e.g., CNN engine), in terms of either false positives or false negatives.

In an embodiment, operation of the VARC, as described above, may be adaptive in a sense that the number of lines to be duplicated (and its location) or the number of filler lines to be inserted may be calculated on the fly for any of the input aspect ratio. Further, the VOGD computed at step 506 of FIG. 5A may be used for all further computations at step 508 such as for performing filter phase selection (VFP), calculation of shift required in the LBx (STIL), duplication of the line and insertion of the "filler" lines in the LBx. These computations may have a lower complexity level and may be suitable for a real-time performance.

In an embodiment, at step 508E, the FIR operations may be performed in the VF sub-block 132 to generate one line of the vertically scaled image frame. Each of the FIR operation may produce one pixel output. Further, a series of the FIR operations on all pixels in the line buffers (LBx) may produce one line of a vertically scaled image frame. The VF sub-block 132 may perform read operation on the LBM module 114 over C2 connection and may shift the required input lines into the line buffers (LBx). Further, to generate each line of the vertically scaled output, the multiple input image lines may be used which are present in the line buffers (LBx). For example, consider use of 16 phase FIR filter with 8 filter taps. In such case, there may be eight line buffers (LB0 to LB7).

The VF sub-block 132 may perform the vertical scaling using the FIR filter over the line buffers (LBx). The filter coefficients required for the FIR filtering operation may be fetched from the VCM module 124 over the C6 connection based on the VFP calculated at step 508A. The contents of the VCM module 124 may be configured by the user using the interface I4. Further, the output of the VF sub-block 132 may be a vertically scaled image with a horizontal resolution being unaltered with reference to the input image frame.

In an embodiment, upon completion of the FIR filtering operation on all the pixels in the LB0 to LB7, one complete output line of the vertically scaled image frame may be generated.

In an embodiment, the steps 508A, 508B, 508C, and 508D may be repeated till all lines of the output image frame are generated.

In an embodiment, it may be observed from the Equations (1) to (3a), (3b) and the exemplary tables provided in FIGS. 8A-8D (as discussed in detailed in subsequent embodiments), that (a) the implementation of the scaling operation, and (b) the maintenance of the input aspect ratio in the output image frame, may be achieved in a 'single-pass'. The STIL as computed in the Equations (3a), (3b) along with a mechanism of duplicating the existing lines in the LBx and introducing the filler lines as needed may facilitate to achieve both the objectives of scaling and maintaining the aspect ratio simultaneously. Also, the computations as performed as part of Equations (1) to (3a), (3b) may be applicable independent of the vertical scaling ratio being integer or fractional.

Figure 5C:
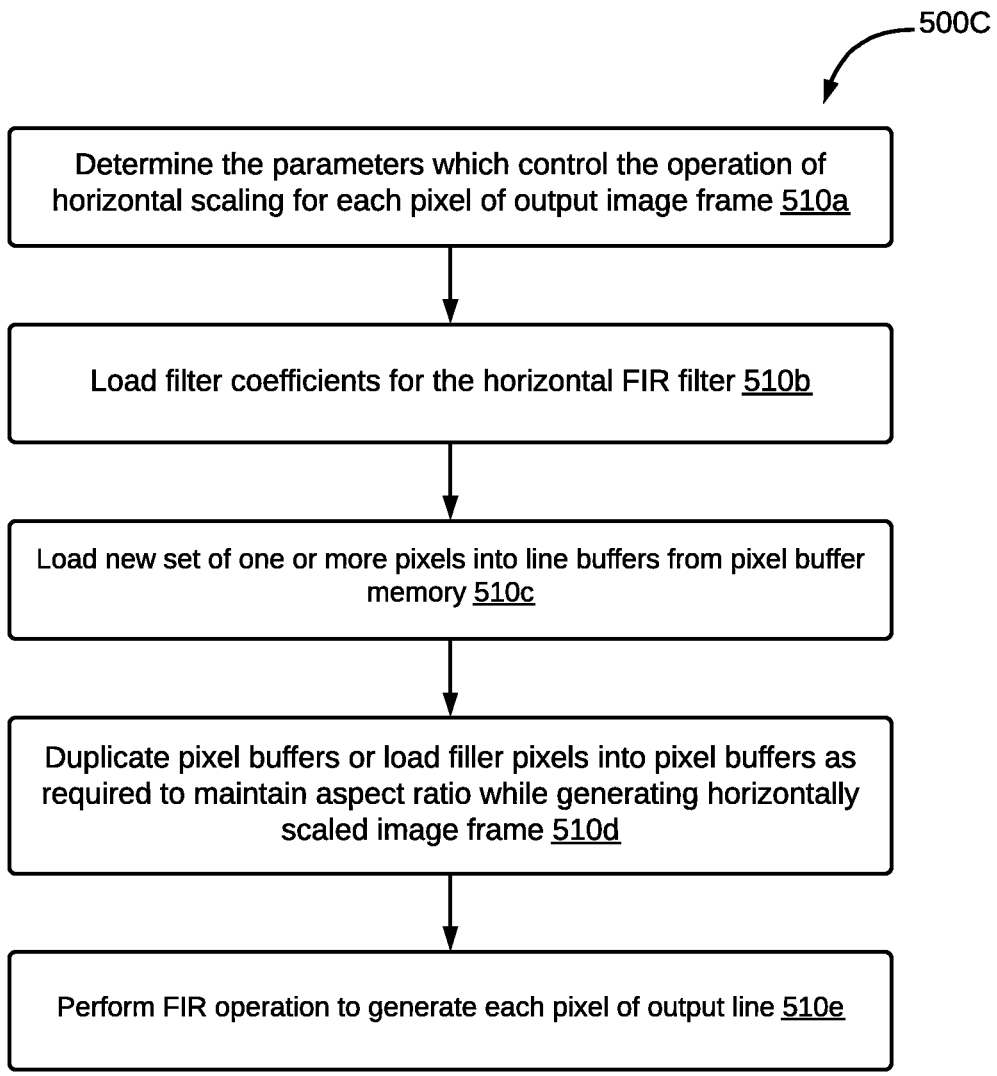
FIG. 5C illustrates a flow diagram of an exemplary process for implementing horizontal scaling on the input image frames while controlling an aspect ratio, in accordance with some embodiments of the present disclosure.

Referring now to FIG. 5C, a flow diagram 500C of an exemplary process for implementing horizontal scaling on the input image frames while controlling an aspect ratio, is illustrated, in accordance with some embodiments of the present disclosure.

With respect to FIG. 5C, at step 510A, calculation of the HOCGD parameters, the HFP parameters and the STIP parameters may be performed. In an embodiment, Horizontal filter taps (HFT) may represent a number of filter taps in the horizontal FIR filter. For example, consider use of a 16 phase FIR filter with 8 filter taps for the downscaling and 4 filter taps for the upscaling. This may also be represented as the HFT used for the downscaling is 8, and the HFT used for the upscaling is 4. In an embodiment, if an identical FIR filter implementation is used in both vertical and horizontal directions, then the number of filter taps may be same in the horizontal lines and the vertical filters.

In an embodiment, the number of bits to denote horizontal filter phases (NBHFP) may denote a number of binary bits needed to represent the HFP. For example, NBHFP=4 when NHFP=16. Further, if an identical polyphase FIR scaling filter is used in both the vertical and the horizontal directions, then the number of binary bits needed to represent the filter phases in both the horizontal filters and the vertical filters may be same.

In an embodiment, the HOCGD may be reset to ZERO at beginning of each new line of the output image frame and may be updated for each new output pixel generated by the HSM. The HOCGD may be computed as:

The HOCGD (new pixel)=sum of the HOCGD (previous pixel) and the HOGD     Equation (4)

For example, the HOCGD may also be defined to be 32 bits with most significant 16 bits allocated for the integer part, while the least significant 16 bits allocated for the fractional part, where an integer part binary bit range from bit 31 to bit 16, most significant bit of Integer part (MSINT) is represented as bit 31, a least significant bit of an Integer part (LSINT) is represented as bit 16, a fractional part binary bit range from bit 15 to bit 0.

By way of an example, if the HOCGD is 31.1, then the HOCGD may be represented as 0x001F0001, where the most 16 significant bits 0x001F may denote 31 which is the integer part while the lower 16 bits 0x0001 may denote 1 which is the fractional part.

In an embodiment, the Horizontal filter phase (HFP) may represent the phase of the horizontal polyphase FIR filter. The HFP may be a function of the HOCGD and the NHFP. The HFP may be computed as follows:

The HFP is equal to (most significant 16bits of HOCGD) modulus (NHFP)      Equation (5)

Since the HOCGD may be updated for every new pixel of the output image frame, it may follow that the HFP may be recomputed for every new pixel of a line corresponding to the output image frame generated by the HSM.

In an embodiment, the STIP may denote a maximum pixel number of a given line corresponding to the input image frame which may need to be present in the pixel buffer (PBx) in order to generate a given output pixel and hence may control the shifting of the required data from the PBM module 118 to pixel buffer (PBx). The STIP may be a function of the HOCGD and the HFT. The STIP may be reset at beginning of each line of the output image frame and may be updated at new each pixel of the output image frame. Further, the STIP may be computed for each pixel in a line of the output image frame as follows:

The STIP=the sum of Value of (bit range) of the HOCGD and half of the HFT, where bit range=MSINT to (sum of LSINT and NBHFP)

In an embodiment, for the downscaling where 8 tap filter is used:

The STIP may be represented as a sum of value of (bits 31 to 20) of the HOCGD and half of HFT.     Equation (6a)

In an embodiment, for the upscaling where 4 tap filter is used:

The STIP is represented as a sum of value of (bits 31 to 20) of the HOCGD and half of the HFT     Equation (6b)

Figure 6B:
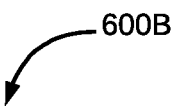
FIG. 6B illustrates exemplary filter coefficients corresponding to a 4-tap polyphase FIR scaling filter used for upscaling input image frames, in accordance with some embodiments of the present disclosure.

In an embodiment, at step 510B, the filter coefficients based on the HFP determined at step 510A may be loaded. For example, for a 16 phase filter, the HFP may take values between 0 and 15. This may be computed by performing a modulus 16 operation on integer portion of the HOCGD. Further, using the HFP as an index, the coefficients may be fetched from the HCM and used for the FIR filter operation. The HCM may hold the coefficients for the downscaling and the upscaling as shown in FIG. 6A and FIG. 6B respectively. It may be noted that the coefficient tables in the HCM and the VCM may be identical given that the same polyphase FIR scaling filter implementation may be used in both the vertical direction as well as the horizontal direction.

In an embodiment, at step 510C, new pixels may be loaded into the pixel buffer (PBx) and existing contents that the PBx constitutes may be shifted. For generation of each of the pixel of the horizontally scaled image line, multiple input pixels may be used. For generation of a next pixel of the output line, the existing contents of the pixel buffers (PBx) may need to be shifted to accommodate one or more input pixels from the PBM module 118 which need to be loaded into pixel buffer (PBx). The shifting may be controlled by the HCL sub-block 136 and may be based on the STIP calculated at step 510A. This is illustrated in a tabular form in FIG. 9A, where contents of the PBx needed for generation of the output pixel 0 may be [4-3-2-1-0-0-0-0] while the contents of the PBx needed for generation of the output pixel 1 may be [8-7-6-5-4-3-2-1] where each element may represent the input pixel being fetched from the PBM module 118.

In an embodiment, at step 510D, operation of the HARC involving duplication of the pixels and insertion of the "filler" pixels to maintain the input aspect ratio at the output image frames may be performed. The HARC may work in conjunction with the HF sub-block 138 and the HCL sub-block 136. Further, the main functionality of the HARC may be to ensure the following: (a) the output image frame may have the same aspect ratio as the input image frame, (b) to generate the output image frame with a square resolution while the input image frame has a rectangular resolution. The HARC may handle special considerations which may arise at beginning and end of each line of the output image frame summarized under 3 cases below.

Case-1: The STIP may be less than the HFT. Such a condition may happen at the beginning of the output image frame.

Case-2: The STIP may be greater than (NUM_IP_PIXELS-1) but the difference is less than half of the HFT. This condition happens during the pixel generation towards an end of the output line.

Case-3: The STIP may be greater than (NUM_IP_PIXELS-1) with a difference being greater or equal to half of the HFT. Such a condition may typically happen during the pixel generation towards end of the output line.

In an embodiment, the operation of the HARC in each of the above mentioned cases may be summarized as follows:

Case-1: If the STIP is less than the HFT, then there may not be enough input pixels to fill all the pixel buffers (PBx) needed for the FIR operation. In such a case, the first (HFT-STIP) pixel buffers may hold identical data. For example, if the STIP is 4 and the HFT is 8 then the pixel buffers (PBx) may need to be loaded as follows: (PB7-PB6-PB5-PB4-PB3-PB2-PB1-PB0) may be filled with pixels (4-3-2-1-0-0-0-0).

This implies that PB0, PB1, PB2, PB3 may all hold pixel 0 while PB4 may hold pixel 1, PB5 may hold pixel 2, PB6 may hold pixel 3 and PB7 may holds pixel 4. The generation of pixel 0 of the line in the output image frame is illustrated in the table at FIG. 9A, where the STIP is 4 while 8 pixels may be required to fill up all the pixels buffers (PBx).

Case-2: If the STIP is less than the sum of (NUM_IP_PIXELS-1) and (half of HFT), then the last pixel of an input line may be reached before generating last pixel of the output line. In such a case, operation such as copy "last" pixel available into the line into pixel buffers (PBx) may be needed. This is illustrated in FIG. 9A for generation of the pixel 7 of the output image, where the STIP is 32 while the (NUM_IP_PIXELS-1) is 29. Hence pixel 29 may be copied into PB7, PB6 and PB5.

Case-3: If the STIP is greater than or equal to a sum of (NUM_IP_PIXELS-1) and (half of the HFT), then the last pixel of the input line may be reached before generating the last pixel of the output line. In such a case, "filler" data may be inserted into all the pixel buffers (PBx). This is illustrated in FIG. 9C for generation of pixel-6 of the output image frame, where the STIP is 5 while the (NUM_IP_PIXELS-1) is 3.

By way of an example, ZERO may be loaded into the pixel buffer (PBx) as "filler" pixel data and this may be represented as "null pixel" (NP) in the tables illustrated in FIGS. 9A-9C. This insertion may be done to ensure scaling, from rectangular to square resolution, while maintaining the input aspect ratio in the output image frame. ZERO may be chosen for the "filler" since any other data may distort the scaled image and thereby adversely impact the object classification or detection accuracy of the output device 108 (e.g., CNN engine), in terms of either false positives or false negatives.

Further, the operation of the HARC, as described above, may be adaptive in a sense that the number of pixels to be duplicated (and its location) or the number of filler pixels to be inserted may be calculated on the fly for any input aspect ratio. It may also be seen that the HOGD computed at step 506 of FIG. 5A may be used for all further computations at step 510 like the filter phase selection (HFP), the calculation of shift required in the PBx (STIP), the duplication of pixels and the insertion of "filler" pixels in the PBx. These computations may have a lower complexity level and may be suitable for a real-time performance.

In an embodiment, at step 510E, the FIR operations may be performed in the HF sub-block 138 to generate each pixel of the output image frame. The HF sub-block 138 may perform FIR operations on the pixel buffers (PBx) to generate pixel data corresponding to each line of the output image frame. Each of the FIR operation may produce one pixel of a given line in the output image frame. The HF sub-block 138 may perform a read operation on the PBM module 118 over the C4 connection and may shift the required input pixels into the pixel buffers (PBx). To generate each pixel of the output image frame, multiple pixels from the vertically scaled image frame may be used which are present in the pixel buffers (PBx). For example, consider use of a 16 phase FIR filter with 8 filter taps. In such case, there may be eight pixel buffers (PB0 to PB7).

The HF sub-block 138 may perform horizontal scaling using the FIR filter over the pixel buffers (PBx). The filter coefficients required for the FIR filtering operation may be fetched from the HCM module 122 over the C5 connection based on the HFP calculated at step 510A. The contents of HCM module 122 may be user configurable using the interface I3. Further, upon completion of the FIR filtering operation on the pixels in the PB0 to PB7, one pixel of the output image frame may be generated. This may continue till all the pixels belonging to a given input line from the PBM module 118 may be loaded into the PBx. This may complete generation of a single output line which is horizontally scaled. This process may be repeated till all the lines of the output image frame are generated.

In an embodiment, it may be observed from the Equations (4) to (6a), (6b) and the exemplary tables provided in FIGS. 9A-9C (as discussed in detailed in subsequent embodiments), that (a) the implementation of the scaling operation, and (b) the maintenance of the input aspect ratio at the output image frame, may be achieved in a 'single-pass'. The STIP as computed in the Equations (6a), (6b) along with a mechanism of duplicating the existing pixels in the PBx and introducing the filler pixels as needed, may facilitate to achieve both the objectives of scaling and maintaining the aspect ratio simultaneously. Also, the computations as performed as part of Equations (5) to (6a), (6b) may be applicable independent of the horizontal scaling ratio being integer or fractional.

Figure 7:
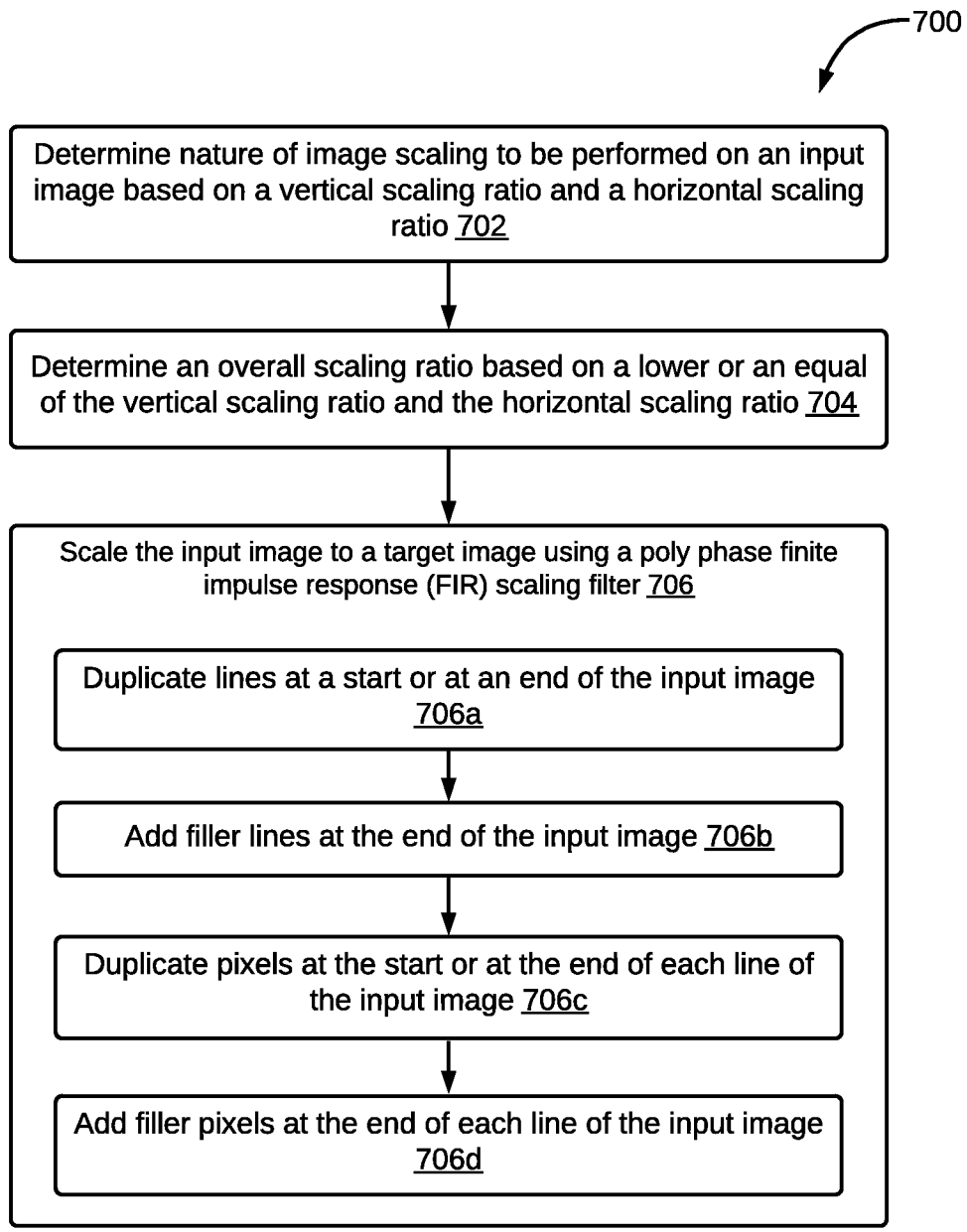
FIG. 7 is a flow diagram of an exemplary process for performing image scaling on an input image frame to obtain an output image frame, while maintaining an input aspect ratio in the output image frame, in accordance with some embodiments of the present disclosure.

Referring now to FIG. 7, a flow diagram 700 of an exemplary process for performing image scaling on the input image frame to obtain an output image frame while maintaining an input aspect ratio in the output image frame, is illustrated, in accordance with some embodiments of the present disclosure. At step 702, a system for image scaling 100 may determine a nature of image scaling required to be performed on an input image based on a vertical scaling ratio and a horizontal scaling ratio. The determination of the nature of image scaling may include determining if the image scaling is an upscaling or a downscaling and if the image scaling is a symmetric scaling or an asymmetric scaling.

At step 704, the system for image scaling 100 may determine an overall scaling ratio based on a lower or an equal of the vertical scaling ratio and the horizontal scaling ratio. It may be noted that the vertical scaling ratio and the horizontal scaling ratio may be determined based on an input image resolution and a target image resolution.

At step 706, the system for image scaling 100 may scale an input image to a target image using a polyphase finite impulse response (FIR) scaling filter based on the nature of the image scaling, the overall scaling ratio, and a structure of the polyphase FIR scaling filter. It may be noted that the scaling may include dynamically performing at least one of duplication of lines at a start or at an end of the input image, addition of filler lines at the end of the input image, duplication of pixels at a start or at an end of each line of the input image, and addition of filler pixels at the end of the each line of the input image.

Further, the structure of the polyphase FIR scaling filter may include a number of filter taps in a polyphase FIR vertical scaling filter, and a number of filter taps in a polyphase FIR horizontal scaling filter. Also, the duplication of lines may be dynamically determined based on an input image resolution, a target image resolution, and the number of filter taps in the polyphase FIR vertical scaling filter, in case of the upscaling or the downscaling.

It may be noted that the addition of the filler lines may be dynamically determined based on an input image resolution, a target image resolution, and the number of filter taps in the polyphase FIR vertical scaling filter, in case of the upscaling. Further, the duplication of pixels may be dynamically determined based on an input image resolution, a target image resolution, and the number of filter taps in the polyphase FIR horizontal scaling filter, in case of the upscaling or the downscaling. Furthermore, the addition of filler pixels may be dynamically determined based on an input image resolution, a target image resolution, and the number of filter taps in the polyphase FIR horizontal scaling filter, in case of the upscaling.

Additionally, the scaling may include scaling, by the system 100, an input image to an interim target image, in case of the asymmetric scaling, and generating the target image by processing the interim target image. The processing may include one of adding a number of filler lines at a start or at an end of the interim target image, and adding a number of filler pixels at a start or at an end of each line of the interim target image. It may be noted that the overall scaling ratio may be based on the horizontal scaling ratio and the overall scaling ratio may be based on the vertical scaling ratio.

In addition, the number of filler lines or the number of filler pixels may be dynamically determined based on an interim target image resolution, a target image resolution, and a difference between the horizontal scaling ratio and the vertical scaling ratio.

Referring now to FIG. 8A is an exemplary table 800A representing a line buffer load and a shift needed for performing ¼ downscaling in a vertical direction of an input image frame with 8 filter taps, is illustrated, in accordance with some embodiments of the present disclosure.

With reference to FIG. 8A, a first column in the table 800A may depict a Line number (Lo) in the output image frame. By way of an example, if an input image frame of 1280 pixels×720 lines resolution (i.e., 1280 pixels per line, 720 lines per image frame), is scaled down to an output image frame having 640 pixels×640 lines resolution (i.e., 640 pixels per line, 640 lines per image frame), then Lo may be represented as Lo=Line number of the output image frame, and the Lo may range from 0 to 639 (i.e., 640 lines in total). Further, input image frame resolution may be represented as 32 pixels×30 lines (32 pixels per line, 30 lines per image frame), and output image frame resolution may be represented as 8 pixels×8 lines (8 pixels per line, 8 lines per image). Further, the VSR may be represented as 8/32=¼ (i.e., lower value of 8/32 and 8/30), the NVFP may be represented as NVFP=16, and the VOGD may be represented as VOGD=16/(¼)=64 (or 0x00400000 in hex format, where most significant 16 bits may denote integer part while the least significant 16 bits may denote the fractional part). Further, 'i' may be represented as, i=a line number in the output image frame.

As illustrated, VOCGD column in the table may be determined as per Equation (1), VFP column in the table may be determined as per Equation (2), STIL (i) column may be determined as per Equation 3(a), the last column in 800A may represent the line numbers of the input image frame which may be needed in the line buffers (LBx) to generate each line of the output image frame. In addition, the VSM may perform FIR filtering operations on a per pixel basis upon the line buffers (LBx) to generate each pixel of the output line. This process may be repeated until all lines of the output image frame are generated. Further, as illustrated in table 800A, to maintain the image resolution, a total of 8 pixels×32 lines (8 pixels per line, 32 lines per image) FIR filtering operations may be performed. It may be noted, that the VSM may not modify width of the input image frame and may perform scaling only in a vertical direction. Since the pixel format in the input image frame may contain multiple components (for example, RGB, YUV, etc.), each of the components may need an independent FIR filter, where all of the independent FIR filters may operate in parallel.

Referring now to FIG. 8B, an exemplary table 800B representing a line buffer load and a shift needed for performing ⅓ downscaling in a vertical direction of an input image frame with 8 filter taps, is illustrated, in accordance with some embodiments of the present disclosure.

With reference to FIG. 8B, first column in the table 800B may represent the Line number (Lo) in the output image frame, VOCGD column in the table may be determined as per Equation (1), VFP column in the table may be determined as per Equation (2), STIL (i) column may be determined as Equation per 3(a), and last column of the table 800B may represent the line numbers of the input image frame which may be needed in the line buffers (LBx) to generate each of a line of the output image frame. By way of an example, with respect to FIG. 8B, the input image resolution may be represented as 24 pixels×18 lines (i.e. 24 pixels per line, 18 lines per image frame), output image resolution may be represented as 8 pixels×8 lines (i.e. 8 pixels per line, 8 lines per image), VSR may be represented as VSR=8/24=⅓ (i.e. lower value of 8/24 and 8/18), NVFP may be represented as, NVFP=16, VOGD may be represented as, VOGD=16/(⅓)=48 (or 0x00300000 in hex format where most significant 16 bits may denote an integer part while the least significant 16 bits may denote the fractional part). Further, 'I' represents a line number in the output image frame As illustrated in table 800B, the VSM may perform FIR filtering operations on a per pixel basis upon the line buffers (LBx), to generate each pixel of an output line. This process may be repeated until all the lines of the output image frame are generated. To handle the input image resolution in the table 800B, a total of 8 pixels×24 lines (i.e., 8 pixels per line, 24 lines per image) FIR filtering operations may be performed. It may be noted, that the VSM may not modify the width of the input image frame and may perform scaling only in the vertical direction. Since the pixel format in the input image frame may contain multiple components (for example, RGB, YUV, etc.), each of the components may need an independent FIR filter, where all of the independent FIR filters may operate in parallel.

Referring now to FIG. 8C, an exemplary table 800C representing a line buffer load and a shift needed for performing 10/8 upscaling in a vertical direction of an input image frame with 4 filter taps, is illustrated, in accordance with some embodiments of the present disclosure.

By way of an example, with reference to FIG. 8C, the input image resolution may be represented as, input image resolution=8 pixels×8 lines (i.e., 8 pixels per line, 8 lines per image), output image resolution may be represented as, output image resolution=10 pixels×10 lines (i.e., 10 pixels per line, 10 lines per image), the VSR may be represented as, VSR=10/8=1.25, NVFP may be represented as NVFP=16, VOGD may be represented as, VOGD=16/(10/8)=12.8 (or 0x00000008 in hex format where most significant 16 bits may denote integer part while the least significant 16 bits may denote the fractional part). Further, T represents line number in the output image frame.

Further, with respect to 800C a first column in the table 800C may represent the Line number (Lo) in the output image frame. VOCGD column in the table may be determined as per (1), VFP column in the table may be determined as per (2), STIL (i) column may be determined as per 3(b), and last column of the table 800C may represent the line numbers of the input image frame which may be needed in the line buffers (LBx) to generate each line of the output image frame.

In an embodiment, the VSM may perform FIR filtering operations on per pixel basis upon the line buffers (LBx) to generate each of the line data. This process may be repeated till all of the lines of the output image frame are generated. To handle the input image resolution in the table 800C, a total of 8×10 FIR filtering operations may be performed. It is to be noted that the VSM does not modify the width of the input image frame and may perform scaling only in the vertical direction. Since the pixel format in the input image frame may contain multiple components (for example, RGB, YUV, etc.), each of the components may need an independent FIR filter, where all of the independent FIR filters may operate in parallel.

Referring now to FIG. 8D, an exemplary table 800D representing a line buffer load and a shift needed for performing 10/8 upscaling in a vertical direction of an input image frame with 4 filter taps, is illustrated, in accordance with some embodiments of the present disclosure.

By way of an example, with reference to FIG. 8D, the input image resolution may be represented as, input image resolution=8 pixels×4 lines (i.e., 8 pixels per line, 4 lines per image), output image resolution may be represented as, output image resolution=10 pixels×10 lines (i.e., 10 pixels per line, 10 lines per image), the VSR may be represented as, VSR=10/8=1.25, NVFP may be represented as NVFP=16, VOGD may be represented as, VOGD=16/(10/8)=12.8 (or 0x00000008 in hex format where most significant 16 bits may denote integer part while the least significant 16 bits may denote the fractional part). Further, T represents line number in the output image frame.

Further, a first column in the table 800D may represent the Line number (Lo) in the output image frame, VOCGD column in the table may be determined as per (1), VFP column in the table may be determined as per (2), STIL (i) column may be determined as per 3(b), and last column of the table 800D may represent the line numbers of the input image frame which may be needed in the line buffers (LBx) to generate each line of the output image frame.

In an embodiment, the VSM may perform FIR filtering operations on per pixel basis upon the line buffers (LBx) to generate each of the line data. This process may be repeated till all of the lines of the output image frame are generated. To handle the input image resolution in the table 800C, a total of 8×10 FIR filtering operations may be performed. It is to be noted that the VSM does not modify the width of the input image frame and may perform scaling only in the vertical direction. Since the pixel format in the input image frame may contain multiple components (for example, RGB, YUV, etc.), each of the components may need an independent FIR filter, where all of the independent FIR filters may operate in parallel.

In an embodiment, with reference to FIGS. 8A-8D, it may also be noted that, in case of downscaling, the input lines may need to be shifted in for each new output line while in case of upscaling, the input lines may be reused one or more number of times for generating the multiple output lines before being shifted. Further, the input lines to be filled in the input frames may depend on a difference between the vertical and the horizontal scaling ratios. Additionally, filling of the lines at end of the input image may depend on the input image frame resolutions and the output image frame resolutions, and on a difference determined between the horizontal scaling ratios and the vertical scaling ratios.

Additionally, the vertical filter in case of receiving the input frames of symmetric resolutions may upscale the input frames by performing duplication of the lines at both the start and the end of the frame and by filling lines at the end of the frame. The vertical filter in this case may perform downscaling by performing duplication of lines at start/end of the frame. Further, the vertical filter may upscale and downscale the input image frame when the received input frames have asymmetric resolutions by duplicating the lines at start/end of the frame and filling lines at the end of the input frame.

Referring now to FIG. 9A, an exemplary table 900A representing a pixel buffer load needed for ¼ downscaling in a horizontal direction with 8 filter taps, is illustrated, in accordance with some embodiments of the present disclosure.

With reference to FIG. 9A, a first column in the table 900A may represent the pixel number (Po) in a line of an output image frame, a HOCGD determined as per (4), HFP determined as per (5), STIP (i) determined as per (6a), and last column representing the pixel numbers of the input image frame which may be needed in the pixel buffers (PBx) to generate each pixel of the output image frame. By way of an example, if an input image frame of 1280 pixels×720 lines resolution (i.e., 1280 pixels per line, 720 lines per image frame) is scaled down to 640 pixels×640 lines resolution (i.e., 640 pixels per line, 640 lines per image frame), then Po may be represented as Po=Pixel number of the output image frame. The Po may range from 0 to 1279 (i.e., 1280 lines in total). The last column in the table 900A may represent the pixel numbers of the line from the input image frame which may be needed in the pixel buffers (PBx) to generate each pixel of a corresponding line in the output image frame. Further, input image resolution may be represented as, input image resolution=30 pixels×32 lines (i.e., 30 pixels per line, 32 lines per image), output image resolution may be represented as, output image resolution=8 pixels×8 lines (i.e., 8 pixels per line, 8 lines per image), HSR may be represented as, HSR=8/32=¼, NHFP may be represented as, NHFP=16.

Additionally, HOGD may be represented as, HOGD=16/(¼)=64 (or 0x00400000 in hex format where most significant 16 bits may denote an integer part while the least significant 16 bits may denote the fractional part). Further, T may be represented as 'i'=pixel number in line of the output image frame.

In an embodiment, the HSM may perform FIR operations upon the pixel buffers (PBx) to generate each output pixel data. This process may be repeated for each pixel of all lines of the output image frame. For the image resolutions handled in 900A, eight FIR operations may be performed to generate each line of the output image frame and this may be repeated for each of the eight lines and hence a total of 64 FIR operations may be performed. Since the pixel format in the input image frame may contain multiple components (for example, RGB, YUV etc.), each component may need an independent FIR filter with each of the independent FIR filter operating in parallel.

Referring now to FIG. 9B is an exemplary table 900B representing a pixel buffer load needed for ⅔ downscaling in a horizontal direction with 8 filter taps, is illustrated, in accordance with some embodiments of the present disclosure.

By way of an example, with reference to FIG. 9B, input image resolution may be represented as, input image resolution=4 pixels×15 lines (4 pixels per line, 15 lines per image), output image resolution may be represented as output image resolution=10×10, HSR may be represented as HSR=10/15=⅔, NHFP may be represented as NHFP=16, HOGD may be represented as HOGD=16/(⅔)=24 (or 0x00180000 in hex format where most significant 16 bits may denote an integer part while the least significant 16 bits may denote the fractional part), and T may be represented as 'i'=pixel number in the line of the output image frame.

Further, with reference to the table 900B, a first column in the table 900B may represent the pixel number (Po) in a line of an output image frame, a HOCGD determined as per (4), a HFP determined as per (5), STIP (i) determined as per (6a), and last column representing the pixel numbers of the input image frame which may be needed in the pixel buffers (PBx) to generate each pixel of the output image frame. It may be noted, that for all pixels greater than one in the output image frame, the NP may be loaded into all the pixel buffers (PBx).

For the image resolutions handled at 900B, ten FIR operations may be performed to generate each line of output image frame and this is repeated for each of the ten lines and hence a total of 100 FIR operations may be performed. Since the pixel format in the input image frame may contain multiple components (for example, RGB, YUV, etc.), each component may need an independent FIR filter with each of the independent FIR filter operating in parallel.

Referring now to FIG. 9C, an exemplary table 900C representing a pixel buffer load needed for 1.75 upscaling in a horizontal direction with 4 filter taps, is illustrated, in accordance with some embodiments of the present disclosure.

By way of an example, with respect to FIG. 9C, an input image resolution may be represented as input image resolution=4 pixels×2 lines (i.e. 4 pixels per line, 2 lines per image), output image resolution may be represented as output image resolution=7 pixels×7 lines (i.e. 7 pixels per line, 7 lines per image), HSR may be represented as HSR=7/4=1.75, NHFP may be represented as NHFP=16, HOGD may be represented as HOGD=16/(7/4)=9.1 (or 0x00090001 in hex format where most significant 16 bits may denote an integer part while the least significant 16 bits may denote the fractional part). Further, T may be represented as 'i'=pixel number in the line of the output image frame.

Further, a first column in the table 900C may represent the pixel number (Po) in a line of an output image frame, a HOCGD determined as per (4), HFP determined as per (5), STIP (i) determined as per (6b), and last column representing the pixel numbers of the input image frame which may be needed in the pixel buffers (PBx) to generate each pixel of the output image frame. It may be noted that for an output pixel 6, NP may be loaded into all the pixel buffers (PBx).

In an embodiment, for the image resolutions handled in the table 900C, seven FIR operations may be performed to generate each line of the output image frame and this may be repeated for each of the seven lines and hence a total of 49 FIR operations may be performed. Since the pixel format in the input image frame may contain multiple components (for example, RGB, YUV, etc.), each component may need an independent FIR filter with each of the independent FIR filter operating in parallel.

Additionally, the horizontal filter in case of receiving the input frames of symmetric resolutions may upscale the input frames by performing duplication of the pixels at both the start and the end of the frame lines and by filling pixels at the end of the frame lines. The horizontal filter in this case may perform downscaling by performing duplication of the pixels at start/end of the frame lines. Further, the horizontal filter may upscale and downscale the input image frame when the received input frames have asymmetric resolutions by duplicating the pixels at start/end of the frame lines and filling pixels at the end of the frame lines.

Referring now to FIG. 10, an exemplary table 1000 representing scaling operations to be performed based on a nature of image scaling required, is illustrated, in accordance with some embodiments of the present disclosure.

In an embodiment, when the nature of image scaling is symmetric upscaling and a vertical filter type is being employed, then scaling operations performed may include duplication of lines at start and/or end of the image frame and/or addition of filler lines at end of the image frame. Further, when the nature of image scaling is symmetric downscaling and a vertical filter type is being employed, then the scaling operations performed may include duplication of lines at start and/or end of the image frame.

In another embodiment, when the nature of image scaling is either asymmetric upscaling or asymmetric downscaling and a vertical filter type is being employed, then the scaling operations performed may include duplication of lines at start and/or end of the image frame and/or addition of filler lines at end of the image frame.

Similarly, when the nature of image scaling is symmetric upscaling and a horizontal filter type is being employed, then the scaling operation performed may include duplication of pixels at start and/or end of the frame lines (i.e., each line of the image frame) and/or addition of filler pixels at the end of the frame lines. Further, when the nature of image scaling is symmetric downscaling and a horizontal filter type is being employed, then the scaling operations performed may include duplication of pixels at start and/or end of the frame lines.

In another embodiment, when the nature of image scaling is either asymmetric upscaling or asymmetric downscaling and a horizontal filter type is being employed, then the scaling operations performed may include duplication of pixels at start and/or end of the frame lines and/or addition of filler pixels at end of the image frame lines.

The disclosed methods and systems may be implemented on a conventional or a general-purpose computer system, such as a personal computer (PC) or server computer. It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for determining a nature of image scaling required to be performed on an input image based on a vertical scaling ratio and a horizontal scaling ratio. The method and system may determine the nature of image scaling may include determining if the image scaling is an upscaling or a downscaling, and determining if the image scaling is a symmetric scaling or an asymmetric scaling. The method and system may determine an overall scaling ratio based on a lower or an equal of the vertical scaling ratio and the horizontal scaling ratio. Further, the method and system may determine scaling an input image to a target image using a polyphase finite impulse response (FIR) scaling filter based on the nature of the image scaling, overall scaling ratio, and a structure of the polyphase FIR scaling filter. The scaling may include dynamically performing at least one of: duplication of lines at a start or at an end of the input image, addition of filler lines at the end of the input image, duplication of pixels at a start or at an end of each line of the input image, and addition of filler pixels at the end of the each line of the input image.

As will be appreciated by those skilled in the art, the techniques described in various embodiments discussed above are not routine, or conventional, or well understood in the art. Moreover, benefit of the present invention may include providing a system and method for simultaneous image scaling and image shaping, while maintaining an input aspect-ratio. The disclosed system and method require limited computing resources and power usage, thereby achieving optimal performance suitable for use in embedded systems and devices. This may be achieved by applying identical scaling ratios on both horizontal and vertical directions, while either duplicating input pixels or lines, or by inserting filler pixels or lines in the output as needed. The method and system may facilitate limiting a need for computation for performing the scaling by avoiding floating point operation by using a grid distance (e.g., integer), limiting computation to integer addition operations for pixel shift, flow control and pixel compensation and filter characteristics (e.g., filter phase, filter coefficients, number of filter taps, and the like) based on a grid distance thus avoiding image distortion.

The specification has described method and system for image scaling. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of image scaling, the method comprising:
   determining, by a system for image scaling, a nature of image scaling required to be performed on an input image based on a vertical scaling ratio and a horizontal scaling ratio, wherein determining the nature of image scaling comprises:
      determining if the image scaling is an upscaling or a downscaling, and
      determining if the image scaling is a symmetric scaling or an asymmetric scaling;
   determining, by the system, an overall scaling ratio based on a lower or an equal of the vertical scaling ratio and the horizontal scaling ratio;
   scaling, by the system, an input image to a target image using a polyphase finite impulse response (FIR) scaling filter based on the nature of the image scaling, the overall scaling ratio, and a structure of the polyphase FIR scaling filter, wherein the scaling comprises dynamically performing at least one of:
      duplication of lines at a start or at an end of the input image;
      addition of filler lines at the end of the input image;
      duplication of pixels at a start or at an end of each line of the input image; and
      addition of filler pixels at the end of the each line of the input image.

2. The method of claim 1, further comprising:
   determining, by the system, the vertical scaling ratio and the horizontal scaling ratio based on an input image resolution and a target image resolution.

3. The method of claim 1, wherein the structure of the polyphase FIR scaling filter comprises:
   a number of filter taps in a polyphase FIR vertical scaling filter; and
   a number of filter taps in a polyphase FIR horizontal scaling filter.

4. The method of claim 3, wherein the duplication of lines is dynamically determined based on an input image resolution, a target image resolution, and the number of filter taps in the polyphase FIR vertical scaling filter, in case of the upscaling or the downscaling.

5. The method of claim 3, wherein the addition of filler lines is dynamically determined based on an input image resolution, a target image resolution, and the number of filter taps in the polyphase FIR vertical scaling filter, in case of the upscaling.

6. The method of claim 3, wherein the duplication of pixels is dynamically determined based on an input image resolution, a target image resolution, and the number of filter taps in the polyphase FIR horizontal scaling filter, in case of the upscaling or the downscaling.

7. The method of claim 3, wherein the addition of filler pixels is dynamically determined based on an input image resolution, a target image resolution, and the number of filter taps in the polyphase FIR horizontal scaling filter, in case of the upscaling.

8. The method of claim 1, wherein scaling comprises:
   scaling, by the system, an input image to an interim target image, in case of the asymmetric scaling; and
   generating, by the system, the target image by processing the interim target image, wherein the processing comprises one of:
      adding a number of filler lines at a start or at an end of the interim target image, when the overall scaling ratio is based on the horizontal scaling ratio; and
      adding a number of filler pixels at a start or at an end of each line of the interim target image, when the overall scaling ratio is based on the vertical scaling ratio.

9. The method of claim 8, wherein the number of filler lines or the number of filler pixels is dynamically determined based on an interim target image resolution, a target image resolution, and a difference between the horizontal scaling ratio and the vertical scaling ratio.

10. A system for image scaling, the system comprising:
    a processor and a memory communicatively coupled to the processor, wherein the memory stores processor-executable instructions, which on execution, cause the processor to:
       determine a nature of image scaling required to be performed on an input image based on a vertical scaling ratio and a horizontal scaling ratio, wherein determining the nature of image scaling comprises:
          determining if the image scaling is an upscaling or a downscaling, and
          determining if the image scaling is a symmetric scaling or an asymmetric scaling;
       determine an overall scaling ratio based on a lower or an equal of the vertical scaling ratio and the horizontal scaling ratio;
       scale an input image to a target image using a polyphase finite impulse response (FIR) scaling filter based on the nature of the image scaling, the overall scaling ratio, and a structure of the polyphase FIR scaling filter, wherein the scaling comprises dynamically performing at least one of:
- duplication of lines at a start or at an end of the input image;
- addition of filler lines at the end of the input image;
- duplication of pixels at a start or at an end of each line of the input image; and
- addition of filler pixels at the end of the each line of the input image.

11. The system of claim 10, wherein the processor-executable instructions, on execution, further cause the processor to:
- determine the vertical scaling ratio and the horizontal scaling ratio based on an input image resolution and a target image resolution.

12. The system of claim 10, wherein the structure of the polyphase FIR scaling filter comprises:
- a number of filter taps in a polyphase FIR vertical scaling filter; and
- a number of filter taps in a polyphase FIR horizontal scaling filter.

13. The system of claim 12, wherein the duplication of lines is dynamically determined based on an input image resolution, a target image resolution, and the number of filter taps in the polyphase FIR vertical scaling filter, in case of the upscaling or the downscaling.

14. The system of claim 12, wherein the addition of filler lines is dynamically determined based on an input image resolution, a target image resolution, and the number of filter taps in the polyphase FIR vertical scaling filter, in case of the upscaling.

15. The system of claim 12, wherein the duplication of pixels is dynamically determined based on an input image resolution, a target image resolution, and the number of filter taps in the polyphase FIR horizontal scaling filter, in case of the upscaling or the downscaling.

16. The system of claim 12, wherein the addition of filler pixels is dynamically determined based on an input image resolution, a target image resolution, and the number of filter taps in the polyphase FIR horizontal scaling filter, in case of the upscaling.

17. The system of claim 10, wherein scaling comprises:
- scaling an input image to an interim target image, in case of the asymmetric scaling; and
- generating the target image by processing the interim target image, wherein the processing comprises one of:
  - adding a number of filler lines at a start or at an end of the interim target image, when the overall scaling ratio is based on the horizontal scaling ratio; and
  - adding a number of filler pixels at a start or at an end of each line of the interim target image, when the overall scaling ratio is based on the vertical scaling ratio.

18. The system of claim 17, wherein the number of filler lines or the number of filler pixels is dynamically determined based on an interim target image resolution, a target image resolution, and a difference between the horizontal scaling ratio and the vertical scaling ratio.

19. A non-transitory computer-readable storage medium storing computer-executable instructions for:
- determining a nature of image scaling required to be performed on an input image based on a vertical scaling ratio and a horizontal scaling ratio, wherein determining the nature of image scaling comprises:
  - determining if the image scaling is an upscaling or a downscaling, and
  - determining if the image scaling is a symmetric scaling or an asymmetric scaling;
- determining an overall scaling ratio based on a lower or an equal of the vertical scaling ratio and the horizontal scaling ratio;
- scaling an input image to a target image using a polyphase finite impulse response (FIR) scaling filter based on the nature of the image scaling, the overall scaling ratio, and a structure of the polyphase FIR scaling filter, wherein the scaling comprises dynamically performing at least one of:
  - duplication of lines at a start or at an end of the input image;
  - addition of filler lines at the end of the input image;
  - duplication of pixels at a start or at an end of each line of the input image; and
  - addition of filler pixels at the end of the each line of the input image.

20. The non-transitory computer-readable storage medium of claim 19, wherein scaling comprises:
- scaling an input image to an interim target image, in case of the asymmetric scaling; and
- generating the target image by processing the interim target image, wherein the processing comprises one of:
  - adding a number of filler lines at a start or at an end of the interim target image, when the overall scaling ratio is based on the horizontal scaling ratio; and
  - adding a number of filler pixels at a start or at an end of each line of the interim target image, when the overall scaling ratio is based on the vertical scaling ratio.

* * * * *